United States Patent
Sampat et al.

(10) Patent No.: US 10,992,524 B2
(45) Date of Patent: *Apr. 27, 2021

(54) USER DEFINED OBJECTS FOR NETWORK DEVICES

(71) Applicant: A10 Networks, Inc., San Jose, CA (US)

(72) Inventors: Rishi Sampat, Santa Clara, CA (US); Rajkumar Jalan, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/176,643

(22) Filed: Oct. 31, 2018

(65) Prior Publication Data

US 2019/0089587 A1    Mar. 21, 2019

Related U.S. Application Data

(63) Continuation-in-part of application No. 14/749,508, filed on Jun. 24, 2015, now Pat. No. 10,129,122, (Continued)

(51) Int. Cl.
*H04L 12/24* (2006.01)
*H04L 29/06* (2006.01)
(Continued)

(52) U.S. Cl.
CPC ...... *H04L 41/0806* (2013.01); *G06F 9/44505* (2013.01); *G06F 9/45558* (2013.01); *G06F 9/54* (2013.01); *G06F 21/00* (2013.01); *G06F 21/57* (2013.01); *H04L 41/0233* (2013.01); *H04L 67/141* (2013.01); *H04L 67/32* (2013.01); *H04L 67/34* (2013.01); *H04L 69/163* (2013.01);
(Continued)

(58) Field of Classification Search
CPC .................................................. H04L 41/0806
USPC .......................................................... 709/203
See application file for complete search history.

(56) References Cited

U.S. PATENT DOCUMENTS 6,600,738 B1    7/2003    Alperovich et al.
6,772,205 B1 *  8/2004    Lavian ................ H04L 41/0213
                                                        370/254

(Continued)

*Primary Examiner* — Kevin T Bates
*Assistant Examiner* — Emad Siddiqi
(74) *Attorney, Agent, or Firm* — Keith Kline; The Kline Law Firm PC

(57) ABSTRACT

Provided are systems and methods for configuring a network servicing node with user-defined instruction scripts. A method for configuring a network servicing node with user-defined instruction scripts may commence with receiving, from a user of the network servicing node, a user loadable program. The user loadable program may include at least the user-defined instruction scripts. The method may continue with receiving a data packet from a data network associated with the user. The method may further include determining a condition associated with the data packet. The method may continue with identifying, in a name table, a program name associated with a program using the condition. The program may be the user loadable program. The method may further include processing the data packet by getting an instruction of the user-defined instruction scripts from a storage module and applying the instruction to the data packet.

19 Claims, 16 Drawing Sheets

Related U.S. Application Data which is a continuation-in-part of application No. 14/492,465, filed on Sep. 22, 2014, now Pat. No. 9,992,229, which is a continuation-in-part of application No. 14/295,265, filed on Jun. 3, 2014, now Pat. No. 9,986,061.

(51) Int. Cl.

| | | |
|---|---|---|
| *H04L 29/08* | (2006.01) | |
| *G06F 9/455* | (2018.01) | |
| *G06F 9/54* | (2006.01) | |
| *G06F 9/445* | (2018.01) | |
| *G06F 21/00* | (2013.01) | |
| *G06F 21/57* | (2013.01) | |

(52) U.S. Cl.
CPC ............ *G06F 2009/45595* (2013.01); *H04L 41/0843* (2013.01); *H04L 63/1458* (2013.01)

(56) References Cited

U.S. PATENT DOCUMENTS

| | | |
|---|---|---|
| 6,804,224 B1 | 10/2004 | Schuster et al. |
| 7,992,201 B2 | 8/2011 | Aldridge et al. |
| 8,081,640 B2 | 12/2011 | Ozawa et al. |
| 8,116,312 B2 | 2/2012 | Riddoch et al. |
| 8,261,339 B2 | 9/2012 | Aldridge et al. |
| 2003/0046583 A1* | 3/2003 | Goldman ............ H04L 63/0263 726/4 |
| 2007/0124502 A1* | 5/2007 | Li ..................... H04L 41/0226 709/246 |
| 2008/0225722 A1* | 9/2008 | Khemani ................ H04L 41/50 370/235 |
| 2010/0192225 A1 | 7/2010 | Ma et al. |
| 2013/0003736 A1* | 1/2013 | Szyszko .................. H04L 45/56 370/392 |
| 2015/0026794 A1 | 1/2015 | Zuk et al. |
| 2015/0085871 A1* | 3/2015 | Harper ..................... H04L 69/18 370/419 |

\* cited by examiner

| NAME TABLE 1105 ||
|---|---|
| cm-se-region | User defined Class "cm-se-region" |
| cm-se-name | User defined Class "cm-se-name" |
| cpu-controller | User defined Class "cpu-controller" |
| cpu | User defined Class "cpu" |
| Fn_pkt_process_rate | User Loadable Program "Fn_pkt_process_rate" |
| Fn_session_alert | User Loadable Program "Fn_session_alert" |
| Fn_confidential_alert | User Loadable Program "Fn_confidential_alert" |

FIG. 12

| OBJECT TABLE 1110 |
|---|
| cm-se-region/se-region:="West Coast"; se-name= [Seattle, BayArea, Los Angeles]; bw=2500Mbps |
| cm-se-name/se-name=Seattle; ip=1.1.1.0/24; bw=200Mbps; conn-limit=500, permit-apps= [http, ftp]; enable-stats-collection=nil |
| cpu-controller/cpu-count=2 |
| cpu/cpu-number=1 |
| cpu/cpu-number=2 |

FIG. 13

USER DEFINED OBJECTS FOR NETWORK DEVICES

CROSS-REFERENCE TO RELATED APPLICATIONS

The present application is a continuation of and claims the priority benefit of U.S. patent application Ser. No. 14/749,508 filed on Jun. 24, 2015, entitled "User Defined Objects for Network Devices," which in turn is a continuation-in-part and claims the priority benefit U.S. patent application Ser. No. 14/492,465 filed Sep. 22, 2014 and entitled "Programming a Data Network Device Using User Defined Scripts with Licenses," which in turn is a continuation-in-part and claims the priority benefit of U.S. patent application Ser. No. 14/295,265 filed Jun. 3, 2014 and entitled "Programming a Data Network Device Using User Defined Scripts." The disclosures of the above-referenced patent applications are incorporated herein by reference for all purposes.

BACKGROUND OF THE INVENTION

Field of the Invention

The present invention relates generally to data networks, and more particularly, to a data network being programmed using user defined objects.

Description of the Related Art

In a typical network deployment scenario, a company, such as a service provider or a corporation, constructs a data network by purchasing or leasing one or more network devices, connecting the devices with each other and to servers and gateways, and configuring the devices to reflect the network design. The data network is controlled and operated by the company. The company may use the data network to serve its clients or internal business divisions. For example, a web hosting service provider hosts websites for its clients and allows the clients' data traffic to be processed by the data network. Often times, the company also provides servers such as web servers or video servers to serve the clients.

Though it is common for a service provider to allow the clients to download and to run client software on the provided servers, it is not possible for the clients to download client software or instructions onto the network devices within the data network. This limitation presents issues to the service provider as well as the clients. As there are many clients and each client has different needs, it is impossible for the service provider to offer a one-size-fits-all or a gold-silver-bronze type of network service policy to accommodate many client needs in the data network. Clients, on the other hand, want to operate their own software, policies, and configuration and control of network resources that they lease from the service provider. All in all, both parties have a common desire to open up the data network so that a client can download client software directly to the network devices and so that the service provider can offer a better business experience to satisfy clients' needs.

It should be apparent from the foregoing that there is a need to provide a method to program a network device with user defined instruction scripts.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for configuring a network servicing node with user-defined instruction scripts. Specifically, a method for configuring a network servicing node with user-defined instruction scripts may commence with receiving, from a user of the network servicing node, a user loadable program. The user loadable program may include at least the user-defined instruction scripts. The method may continue with receiving a data packet from a data network using a network interface associated with the user. The data packet may include at least one of a destination address, a destination port number, and an application protocol. The method may further include determining a condition associated with the at least one of the destination address, the destination port number, and the application protocol. The method may continue with identifying, in a name table, a program name associated with a program using the condition. The program may be the user loadable program. The method may further include processing the data packet by getting an instruction of the user-defined instruction scripts from a storage module and applying the instruction to the data packet.

According to another approach of the present disclosure, there is provided a system for configuring a network servicing node with user-defined instruction scripts. The system may include a network servicing node and a storage module configured to store at least the user-defined instruction scripts. The network servicing node may include an object machine and a network interface to a data network. The network interface being coupled to the object machine. The object machine may be a hardware module and may include a processor configured to receive, from a user of the network servicing node, a user loadable program. The user loadable program may include at least the user-defined instruction scripts. The processor may be further configured to receive a data packet from the data network using the network interface associated with the user. The data packet may include at least one of a destination address, a destination port number, and an application protocol. The processor may be configured to determine a condition associated with the at least one of the destination address, the destination port number, and the application protocol. Furthermore, the processor may be configured to identify, in a name table, a program name associated with a program using the condition. The program may be the user loadable program. The processor may be configured to process the data packet by getting an instruction of the user-defined instruction scripts from a storage module and applying the instruction to the data packet.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not by limitation in the figures of the accompanying drawings, in which like references indicate similar elements.

FIG. 12 illustrates an exemplary embodiment of a name table.

FIG. 13 illustrates an exemplary embodiment of an object table.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
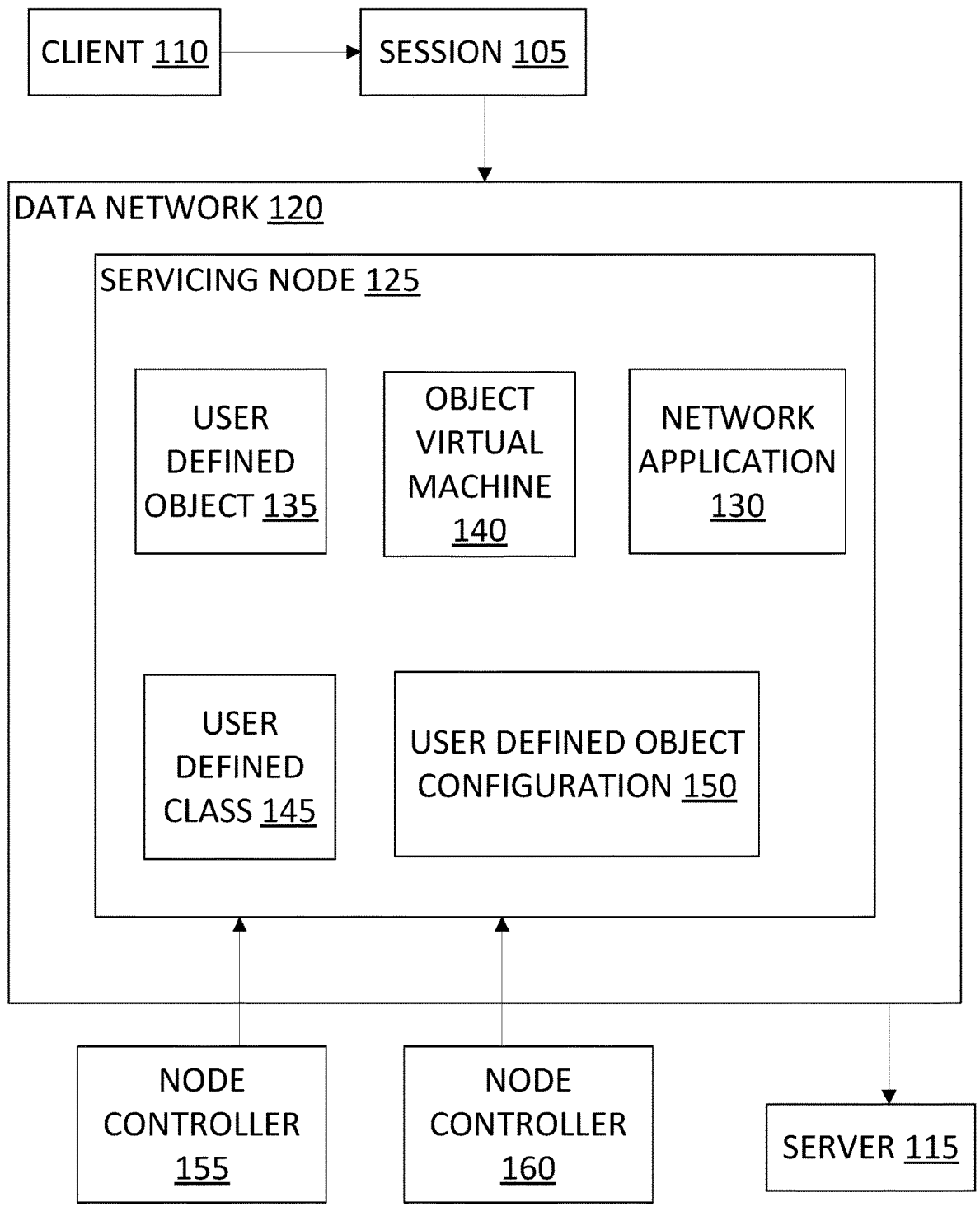
FIG. 1 illustrates an exemplary embodiment of a servicing node servicing a session based on user defined objects.

FIG. 1 illustrates an exemplary embodiment of a servicing node processing a service session 105 (also referred to herein as session 105) between a client 110 and a server 115. In various embodiments, client 110 conducts a session 105 with server 115 over data network 120. Data packets of session 105 are sent through data network 120 to servicing node 125. Servicing node 125 may modify session 105 data packets and forward the data packets to server 115.

In some embodiments, client 110 is a computing device connected to data network 120 using a network module of the client. The client device can be a personal computer, a laptop computer, a tablet, a smartphone, a mobile phone, an Internet phone, a netbook, a home gateway, a broadband gateway, a network appliance, a set-top box, a media server, a personal media player, a personal digital assistant, an access gateway, a networking switch, a server computer, a network storage computer, or any computing device comprising a network module and a processor module.

In various embodiments, server 115 is a server computer connected to data network 120 using a network module of the server computer. Server 115 serves service session 105 requested by client 110. Service session 105 may be an application service session and include, but is not limited to, a HTTP session, a file transfer session, an FTP session, a voice over IP session, a SIP session, a video or audio streaming session, an e-commerce session, an enterprise application session, an email session, an online gaming session, a teleconference session, or a Web-based communication session. Data network 120 includes an Ethernet network, an ATM network, a cellular network, a wireless network, a Frame Relay network, an optical network, an IP network, or any data communication network utilizing other physical layer, link layer capability or network layer to carry data packets.

In some embodiments, servicing node 125 includes a network application 130 and applies network application 130 to session 105 data packets. Network application 130 includes, but is not limited to, a network proxy application such as TCP proxy, HTTP proxy, SIP proxy, a content delivery network application, a server load balancing application, a firewall, a remote access application, an application delivery application, a network traffic management and control application, a legal interception, a network optimization, an email scanning application, or an access control application.

Figure 2:
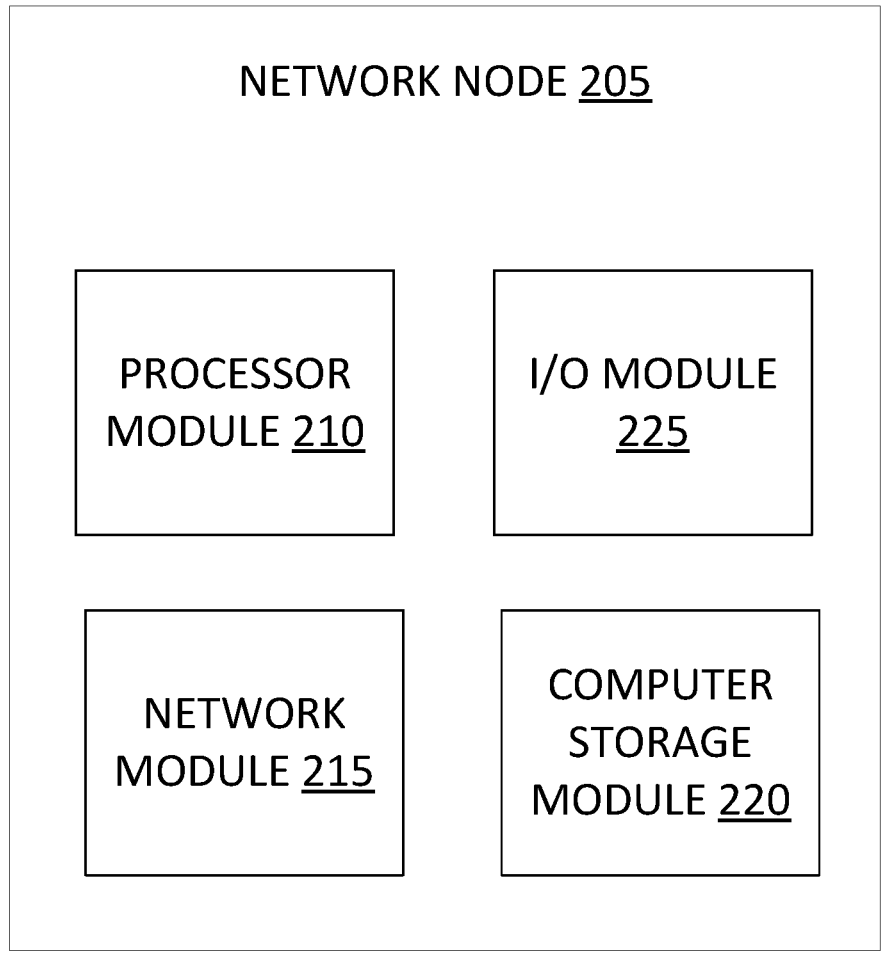
FIG. 2 illustrates an exemplary embodiment of a network node.

FIG. 2 illustrates an exemplary embodiment of a network node 205 which can be a servicing node or a node controller. Network node 205 includes, but is not limited to, a processor module 210, a network module 215, and a computer storage module 220. Processor module 210 includes one or more processors which may be a micro-processor, an Intel processor, an AMD processor, a MIPS processor, an ARM-based processor, or a RISC processor. In some embodiments, processor module 210 includes one or more processor cores embedded in a processor. Additionally, processor module 210 may include one or more embedded processors, or embedded processing elements in a Field Programmable Gate Array (FPGA), an Application Specific Integrated Circuit (ASIC), or Digital Signal Processor (DSP). In various embodiments, network module 215 includes a network interface such as Ethernet, optical network interface, a wireless network interface, T1/T3 interface, or a WAN or LAN interface. Furthermore, network module 215 includes a network processor. Computer storage module 220 includes RAM, DRAM, SRAM, SDRAM, or memory utilized by processor module 210 or network module 215. Computer storage module 220 stores data utilized by processor module 210 and comprises a hard disk drive, a solid state drive, an external disk, a DVD, a CD, or a readable external disk. Additionally, computer storage module 220 stores one or more computer programming instructions, which when executed by processor module 210 or network module 215, implement one or more of the functionalities of the present invention. Network node 205 also may include an input/output (I/O) module 225, which comprises a keyboard, a keypad, a mouse, a gesture-based input sensor, a microphone, a physical or sensory input peripheral, a display, a speaker, or a physical or sensory output peripheral.

Referring again to FIG. 1, in various embodiments, servicing node 125 includes a user defined object 135 and an object virtual machine 140. User defined object 135 includes one or more parameters to enable one or more instructions to be executed by object virtual machine 140. Servicing node 125 may invoke object virtual machine 140 to execute the instructions enabled by user defined object 135 while servicing node 125 processes session 105. In other embodiments, servicing node 125 may apply user defined object 135 in conjunction with network application 130 to process session 105.

In some embodiments, servicing node 125 creates user defined object 135 from a user defined class 145 and a user defined object configuration 150. User defined class 145 includes an instruction script or one or more instructions, a template for one or more instructions, or a description that can be used to create user defined object 135. User defined object configuration 150 includes one or more configurations, one or more commands, one or more pieces of data, or one or more attributes for creating user defined object 135. Node controller 155 programs servicing node 125 with user defined class 145 script or by sending user defined class 145 to servicing node 125. Alternatively, node controller 155 or a further node controller 160 sends to servicing node 125 user defined object configuration 150. While two node controllers are depicted in exemplary FIG. 1, any number of node controllers may be connected to a servicing node.

In various embodiments, servicing node 125 may create and apply user defined object 135 after receiving user defined object configuration 150 and user defined class 145, prior to processing session 105, or when processing session 105 is in progress.

Figure 3:
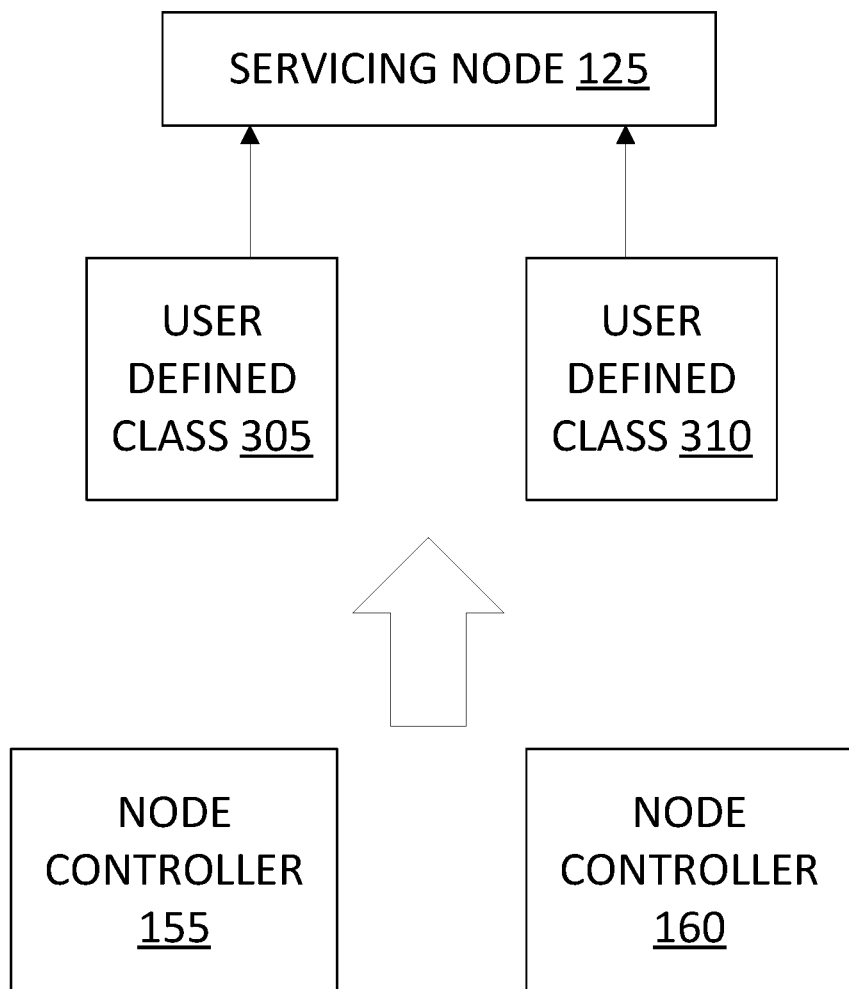
FIG. 3 illustrates an exemplary embodiment of programming a servicing node with user defined class.

FIG. 3 illustrates an exemplary embodiment for servicing node 125 to receive a plurality of user defined classes such as user defined class 305 and user defined class 310. Servicing node 125 may receive the plurality of user defined classes from node controller 155 or from a plurality of node controllers such as node controller 155 and node controller 160.

In some embodiments, user defined class 305 and user defined class 310 are not related. In other embodiments, user defined class 305 is related to user defined class 310. Table 1a and Table 1b illustrate exemplary embodiments of user defined class 305 and user defined class 310.

TABLE 1a

```
// User Defined Class 305
name = ud-se-name,         // Name of User Defined Class
license = se-isp,          // require license named "se-isp"
config-fields:
config = <start>,
        // created object has a name identity
    se-name = type-string, help-str SE name,
        // object has an IP address attribute
    ip = type-cidr, help-str SE IP address range>,
        // Security policy
    ddos-checks = type-bool, help-str Enable ddos checks on SE,
        // Service policy, such as bandwidth (bw), capacity, allowed
network appl
    bw = type-number, help-str Mbps,
    conn-limit = type-number, help-str No. of connections,
        // selectable list of network applications
    permit-apps = type-keyword, help-str Permit application list,
    http = type-flag,
    ftp = type-flag,
    https = type-flag,
        // accounting policy
    enable-stats-collection = type-flag,
config=<end>;
```

TABLE 1b

```
// User Defined Class 310
name=ud-se-region
help=Create/delete a region object,
```

TABLE 1b-continued

```
license=se-isp,
config-fields:
config=<start>,
    se-region=type-string, help-str SE region,
        // User Defined Class 310 uses User Defined Class
            305 "se-name"
    se-name=type-string, help-str SE name
    ud-se-name>,
config=<end>;
```

In Table 1a, user defined class 305 is named "ud-se-name". The attribute occurrences being "multiple" allows servicing node 125 to create multiple user defined objects based on user defined class 305. The attribute license "se-isp" indicates user defined class 305 requires a license "se-isp" in order to create an associated user defined object. The attribute config-fields includes a list of configurable attributes which are to be included in a user defined object configuration. The config attribute se-name assigns a name to a created user defined object. The config attribute ip assigns an IP address or IP address range to a created user defined object. Typically, different created user defined objects of user defined class 305 are configured with different IP addresses. The ip attribute allows object virtual machine 140 to determine if a user defined object is applicable to a session data packet. The config attributes may include other attributes such as layer 2 information, TCP/UDP port number, a pattern, a cookie, a layer 7 identifier, or any attribute that can be used to identify a data packet or a session.

The config attributes may include one or more attributes related to a security policy such as ddos-checks (applying Denial of Service (DOS) and Distributed Denial of Services (DDOS) detection). The config attributes include one or more attributes related to service policy such as bw (bandwidth capacity), conn-limit (capacity of active connections), and others. The config attributes may include permission to use one or more network applications available within servicing node 125, such as http, ftp, and https. The config attributes may further include one or more attributes related to data collection or accounting record processing or policy, such as enable-stats-collection (enabling the collection of various statistics).

Table 1b illustrates an embodiment of user defined class 310. In this exemplary embodiment, user defined class 310 refers to user defined class 305. The name attribute gives user defined class 310 a name of "ud-se-region". The help attribute indicates a network administrator may get help in order to generate a user defined object configuration using ud-se-region. The occurrences attribute "multiple" indicates multiple user defined objects using ud-se-region can be created. In other embodiments, having occurrences attribute "single" is to indicate at most one user defined object can be created based on the user defined class. The license attribute indicates a license named "se-isp" is required. In the exemplary embodiment of Table 1b, ud-se-region uses the same license as ud-se-name. In other embodiments, ud-se-region has a different license attribute than ud-se-name.

The config attributes of ud-se-region include se-region attribute assigning a name to a user defined object using ud-se-region. The configurable se-name attribute includes a list of user defined objects with names based on se-name. Recall Table 1a where se-name is a configurable name for a user defined object of ud-se-name. The configurable se-name attribute of ud-se-region, therefore, includes a list of user defined objects of ud-se-name.

Figure 4:
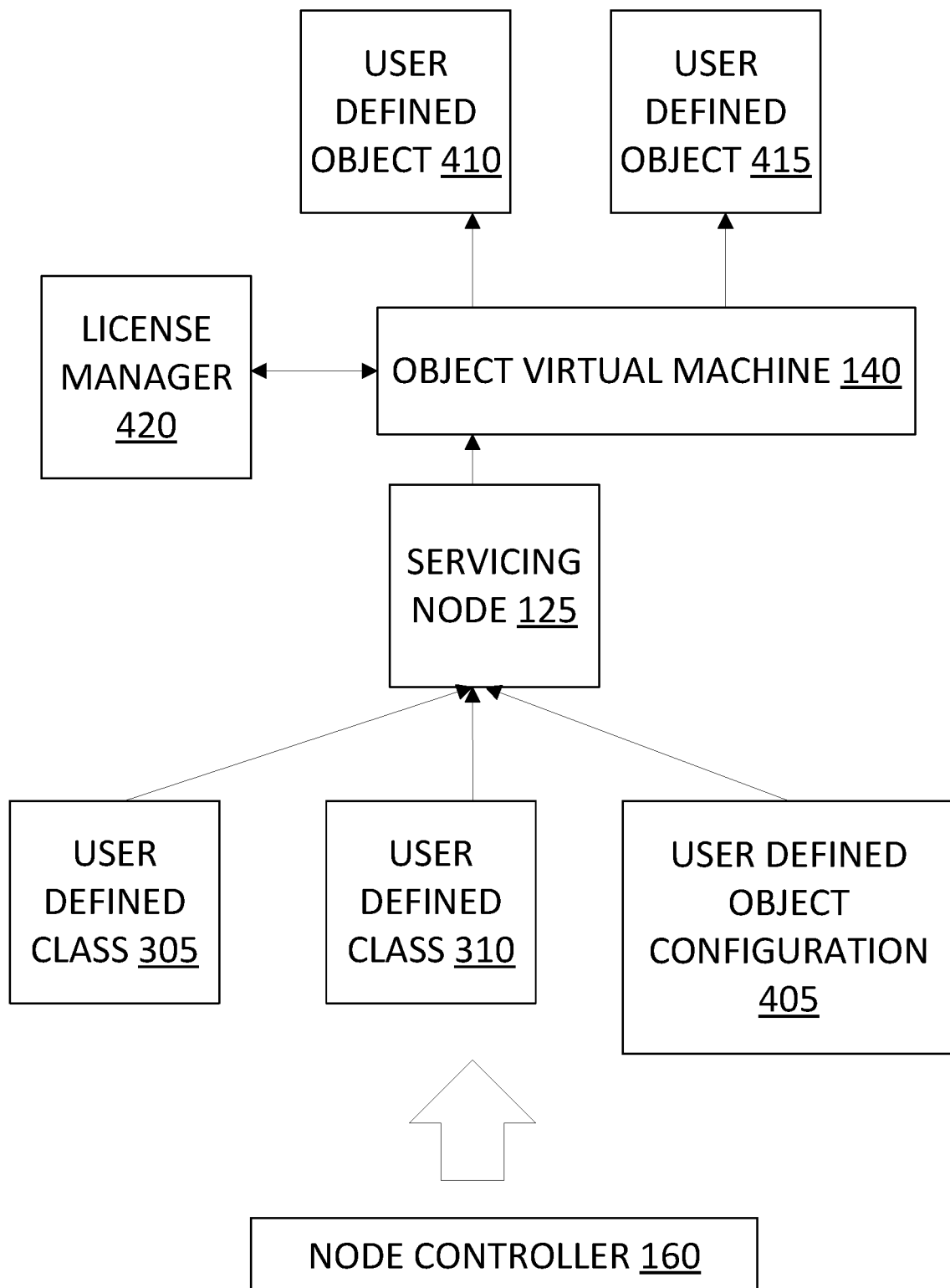
FIG. 4 illustrates an exemplary embodiment of configuring user defined objects.

Referring to FIG. 4, servicing node 125 receives user defined object configuration 405 from node controller 160. Table 2 illustrates an exemplary embodiment of user defined object configuration 405 based on Table 1a and Table 1b.

TABLE 2

// User Defined Object Configuration 405
ud-se-name se-name=Seattle ip=1.1.1.0/24 bw=200Mbps
conn-limit=500 permit-apps http ftp enable-stats-collection
ud-se-name se-name="Bay Area" ip=1.1.3.0/23 bw=500Mbps
ddos-check conn-limit=2000 permit-apps http ftp https
enable-stats-collection
ud-se-name se-name="Los Angeles" ip=1.1.5.0/23 bw=1000Mbps
conn-limit=2500 permit-apps http ftp https enable-stats-collection
ud-se-region se-region="West Coast" se-name=Seattle
se-name="Bay Area" se-name="Los Angles" bw=2500Mbps In Table 2, three ud-se-name objects are configured. The first one is named Seattle with an IP address 1.1.1.0/24, a bandwidth capacity of 200 Mbps, a connection capacity of 500, a list of permitted network applications "http, ftp", and with statistics data collection enabled.

The second ud-se-name object is named "Bay Area" with a configured IP address 1.1.3.0/23, a bandwidth capacity of 500 Mbps, a connection capacity of 2000, a list of permitted network applications "http, ftp, https", and with statistics data collection enabled. Se-name object "Bay Area" also has security policy DDOS enabled.

The third ud-se-name object is named "Los Angeles" with a configured IP address 1.1.5.0/23, a bandwidth capacity of 1000 Mbps, a connection capacity of 2500, a list of permitted network applications "http, ftp, https" and with statistics data collection enabled.

User defined object configuration 405 includes one configured ud-se-region object, named "West Coast" and a bandwidth capacity of 2500 Mbps. The ud-se-region object includes the se-name objects "Bay Area", Seattle, and "Los Angeles". In this embodiment, the bandwidth capacity of 2500 Mbps is applied as the capacity for the combined bandwidth capacities of se-name objects "Bay Area", Seattle and "Los Angeles".

Upon receiving user defined object configuration 405 and user defined classes 305 and 310, servicing node 125 instructs object virtual machine 140 to generate various user defined objects according to configuration 405, such as user defined objects 410 and 415. In some embodiments, object virtual machine 140 determines that a user defined class requires a license. Object virtual machine 140 communicates with a network license manager 420, which can be a network computer or a software module in a network server or in a node controller. Once object virtual machine 140 determines that servicing node 125 is licensed to use the user defined class, object virtual machine 140 creates the user defined object, such as ud-se-name object "Bay Area". In some embodiments, object virtual machine 140 verifies the necessary licenses to use user defined classes 305 and 310, object virtual machine 140 creates ud-se-name objects "Bay Area", Seattle and "Los Angeles", and ud-se-region object "West Coast".

Figure 5:
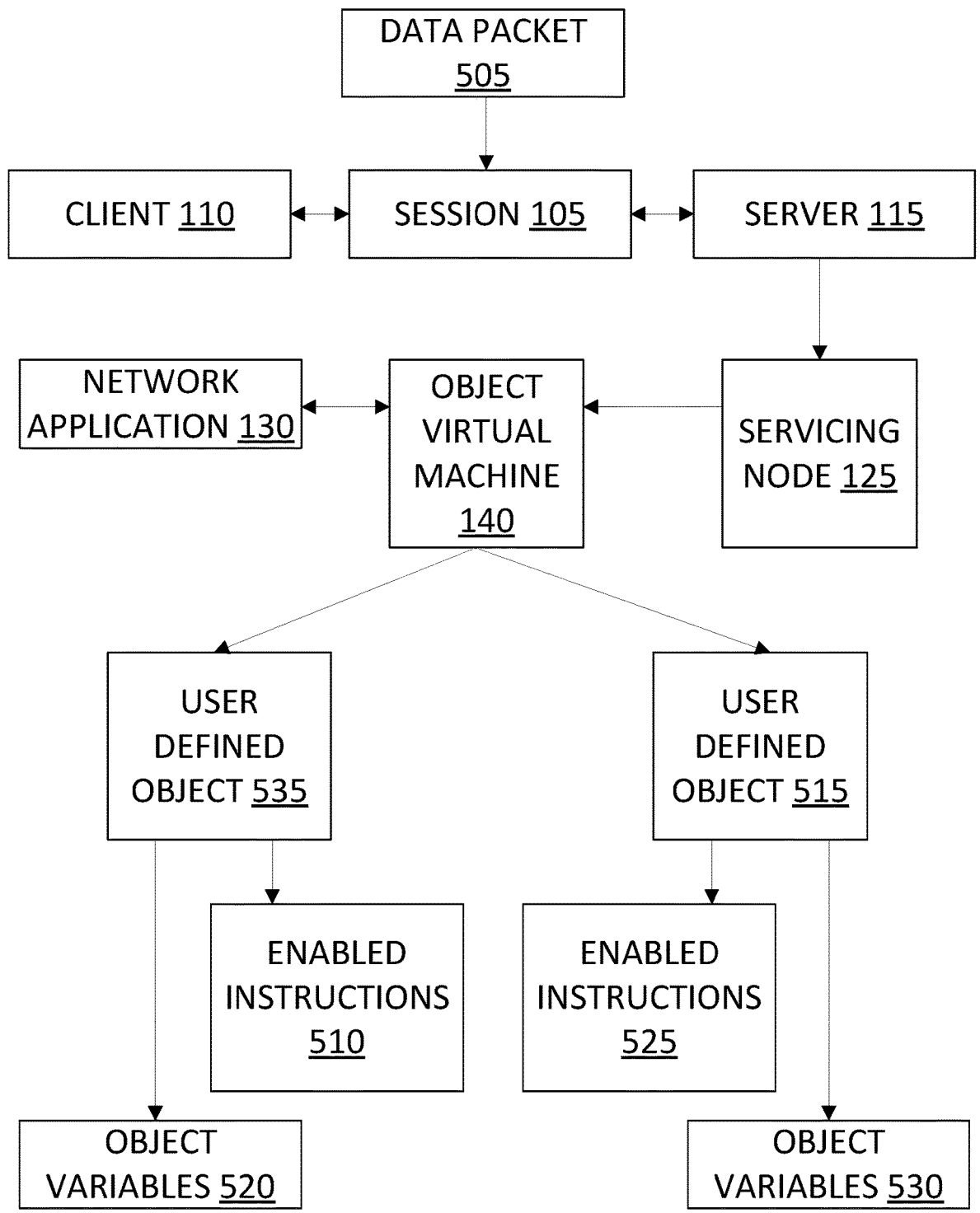
FIG. 5 illustrates an exemplary embodiment of processing a data packet of a session using user defined objects.

FIG. 5 illustrates an exemplary embodiment of processing a data packet 505 of session 105. Data packet 505 may be sent by client 110 to server 115 or from server 115 to client 110. In various embodiments, client 110 sends data packet 505 to server 115, and servicing node 125 receives data packet 505. Then, servicing node 125 sends data packet 505 to object virtual machine 140 for processing, and object virtual machine 140 matches data packet 505 with user defined object 535. Using an embodiment where user defined object 535 is an ud-se-name object named "Bay Area", object virtual machine 140 matches the ud-se-name IP address attribute with an IP address of data packet 505 such as a destination IP address or a source IP address. If object virtual machine 140 determines there is a match, object virtual machine 140 applies ud-se-name object "Bay Area" to data packet 505. In some embodiments, object "Bay Area" enables instructions 510 based on configured attributes of object "Bay Area", which include ddos-check, enable-stats-collection, bandwidth capacity, connection capacity, and a list of permissible network applications. Object virtual machine 140 applies instructions 510 to data packet 505. In various embodiments, object virtual machine 140 checks data packet 505 for DDOS detection and collects data statistics such as packet count, data count, and/or connection count. If a DDOS is detected, object virtual machine 140 may apply security policy handling to data packet 505 or session 105. In other embodiments, object virtual machine 140 checks data packet 505 for bandwidth capacity for object "Bay Area". If bandwidth capacity for object "Bay Area" is not exceeded, data packet 505 is allowed to be processed further. However, if the bandwidth capacity for object "Bay Area" is exceeded, object virtual machine 140 may delay processing data packet 505 until bandwidth capacity is no longer exceeded or object virtual machine 140 may discard data packet 505.

In some embodiments, object virtual machine 140 matches data packet 505 against the list of permissible network applications in object "Bay Area". Object virtual machine 140 retrieves layer 7 information from data packet 505, such as a TCP/UDP port number, content in the data packet 505 payload, or information based on a prior data packet of session 105, to match the list of network applications. If data packet 505 represents a HTTP data packet and HTTP is in the list of permissible network applications, object virtual machine 140 allows continuing processing of data packet 505. If, for example, data packet 505 represents a SIP data packet and SIP is not in the list of permissible network applications, object virtual machine 140 may discard data packet 505 or record an alert event for servicing node 125.

In various embodiments, object virtual machine 140 determines user defined object 515, for example, being ud-se-region object "West Coast", is to be applied. Object virtual machine 140 may determine to apply user defined object 515 based on the association between ud-se-region object "West Coast" and se-name object "Bay Area" or based on a match between data packet 505 and user defined object 515. Object virtual machine 140 applies instructions 525 enabled by the configurable attributes of ud-se-region object "West Coast," which include bandwidth capacity and statistics collection. Object virtual machine 140 processes data packet 505 for bandwidth capacity and statistics collection according to the corresponding object "West Coast" configured values.

In some embodiments, user defined object 535 is associated with one or more object variables 520, such as one or more counters for the statistics collection, bandwidth capacity, number of active connections, and DDOS detection variables. Object virtual machine 140 updates values of object variables 520 upon processing data packet 505. Object virtual machine 140 may update object variables 520 from time to time or based on administrator's command. In a similar embodiment, object virtual machine 140 updates object variables 530 associated to user defined object 515.

Object virtual machine 140 further sends data packet 505 to network application 130 for processing. During processing of data packet 505, network application 130 may invoke object virtual machine 140 for additional processing. Using ud-se-name object "Bay Area" for illustration, network application 130 determines if data packet 505 is a connection request. Network application 130 invokes object virtual machine 140 to process a connection request, and object virtual machine 140 determines that object "Bay Area" is applicable and checks if the connection capacity attribute of object "Bay Area" is exceeded. If the connection capacity attribute of object "Bay Area" is not exceeded, object virtual machine 140 instructs network application 130 to continue processing data packet 505. If the connection capacity attribute of object "Bay Area" is exceeded, object virtual machine 140 may instruct network application 130 to reject the connection request or to delay processing data packet 505 until the connection capacity attribute is no longer exceeded. In some embodiments, object virtual machine 140 updates object variables 520 of object "Bay Area". In another embodiment, object virtual machine 140 determines if user defined object 515 or object "West Coast" is also applicable. Object virtual machine 140 applies enabled instructions 525 of object "West Coast" to the connection request of data packet 505, and updates object variables 530 of object "West Object."

In some embodiments, if data packet 505 includes a session disconnect indication, network application 130 invokes object virtual machine 140 to process the session disconnect indication of data packet 505.

If user defined object 410 or user defined object 515 includes a layer 7 security policy or service policy configured attribute, network application 130 invokes object virtual machine 140 to apply the appropriate policy.

If network application 130 modifies data packet 505, such as applying a network address translation (NAT), modifying a cookie, replacing some content in data packet 505 payload, inserting data into data packet 505, or other modifications known in the art, network application 130 may invoke object virtual machine 140 to process the modified data packet.

After the processing of data packet 505 by network application 130 and object virtual machine 140, servicing node 125 sends a resulting data packet to client 110 or server 115.

Figure 6:
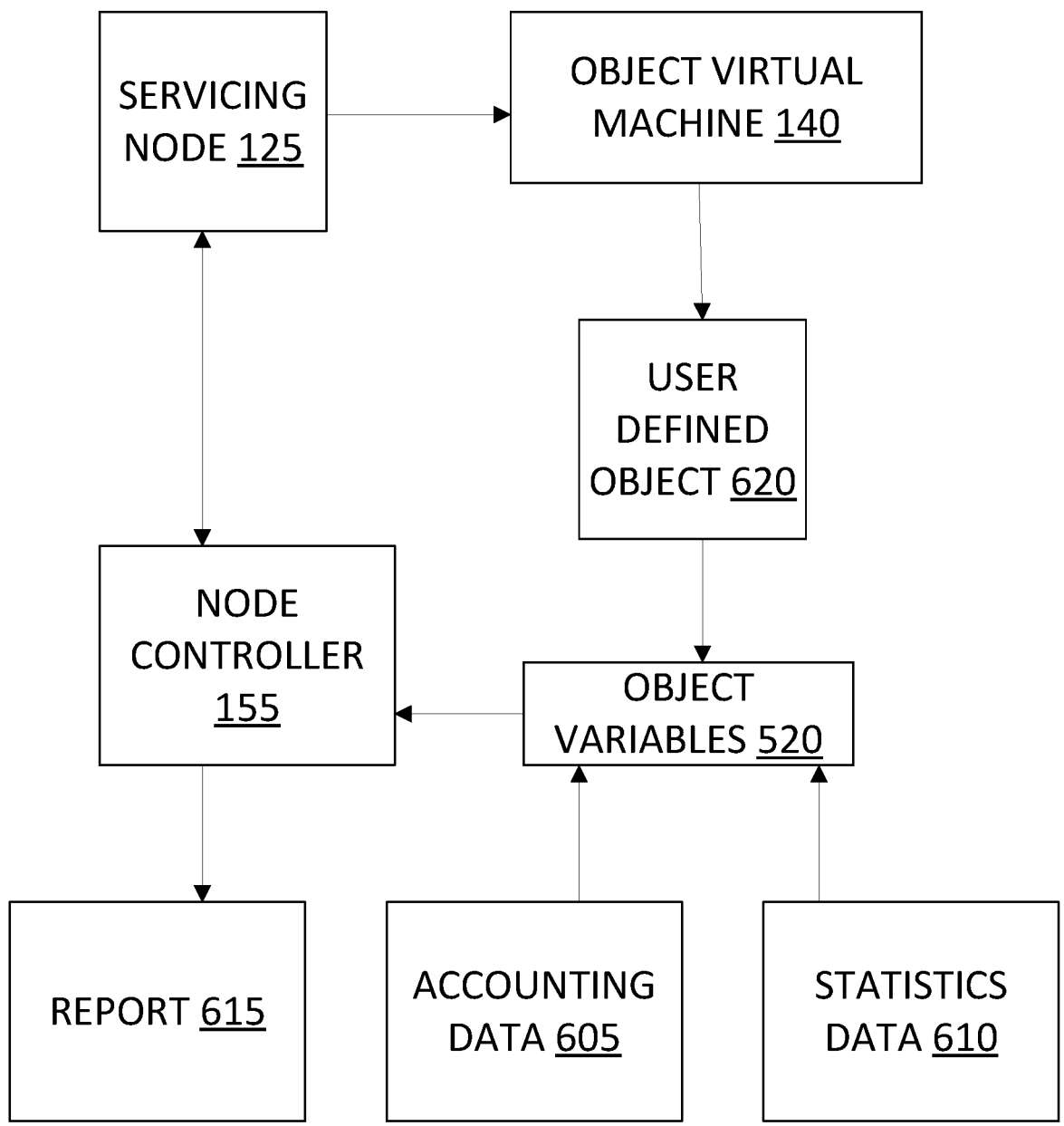
FIG. 6 illustrates an exemplary embodiment of generating accounting data.

In FIG. 6, object virtual machine 140 provides object variables 520 of user defined object 410 to a node controller 155. Object variables 520 may include accounting data 605 and/or statistics data 610. Accounting data 605 may include number of completed connections, number of security alerts based on security policy attributes of user defined object 410, amount of traffic over a period of time, one or more client device identities, one or more user identities of client device, or other useful accounting data. Statistics data 610 may include number of active connections, traffic statistics such as byte count, packet counts, or other statistics data. In some embodiments, node controller 155 receives accounting data 605 and statistics data 610 of user defined object 620. Node controller 155 generates a report 615 based on the received data. Report 615 may include billing report, security report, service level agreement report, network security report, network monitoring report, network capacity or resource utilization report, user report associated to user defined object 620, or report about a service provider, a regional service provider, a business entity associated to user defined object 620, or a client. In various embodiments, node controller 155 generates report 615 based on additional data of other user defined objects obtained from servicing node 125 or other servicing nodes.

In some embodiments, node controller 155 requests servicing node 125 to provide the data associated to user defined object 620 and/or other user defined objects created by object virtual machine 140. Node controller 155 may request from time to time, periodically, or based on a schedule, or node controller 155 may send a request per administrator command.

Alternatively, in various embodiments, servicing node 125 sends the data automatically to node controller 155 from time to time, periodically, or based on a schedule. Servicing node 125 may send the data or portion of the data based on an event, a security alert, or an administrator command, or servicing node 125 may send the data when user defined object 410 is removed from object virtual machine 140.

Figure 7:
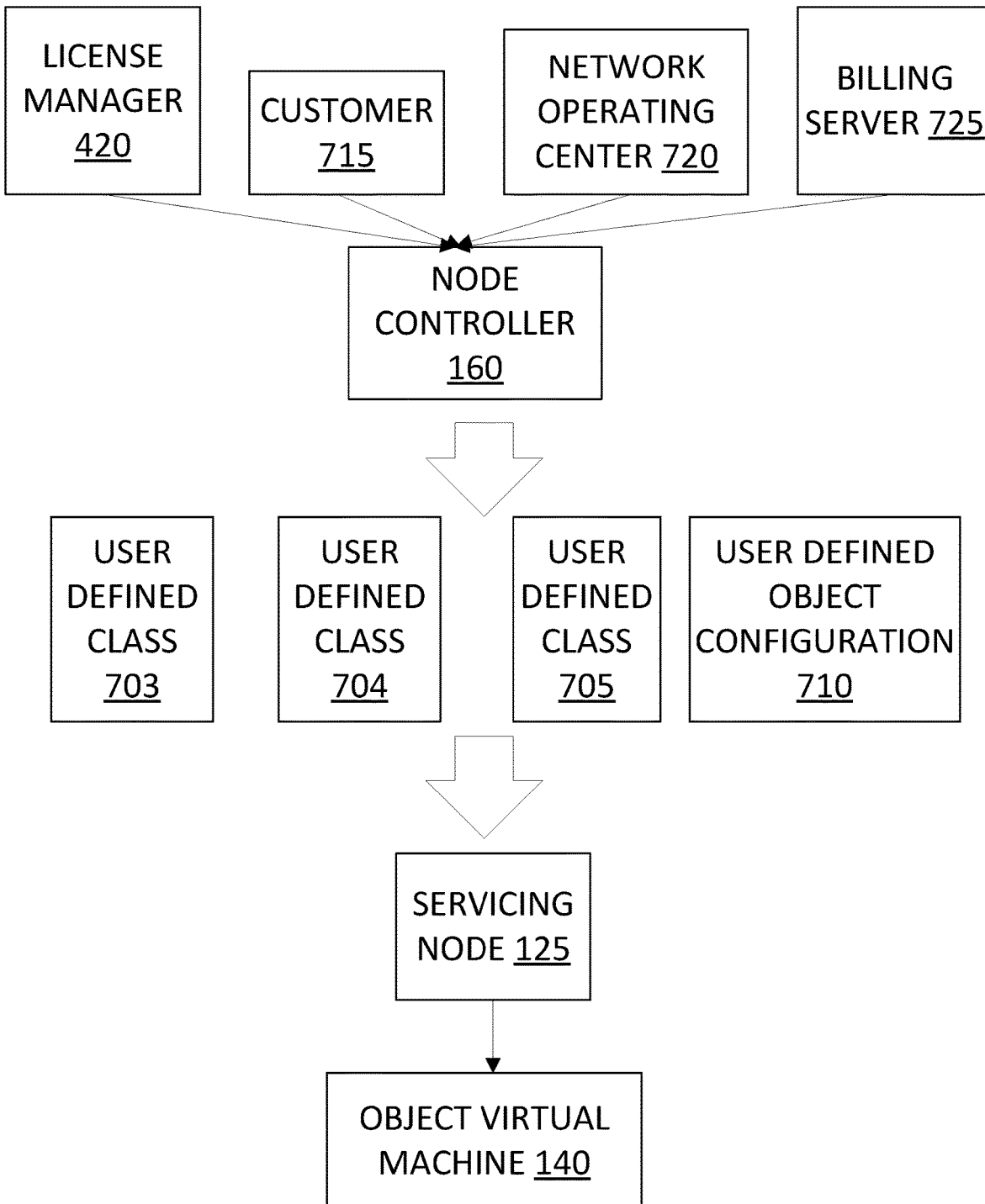
FIG. 7 illustrates an exemplary embodiment of deploying network services using user defined objects
Figure 8:
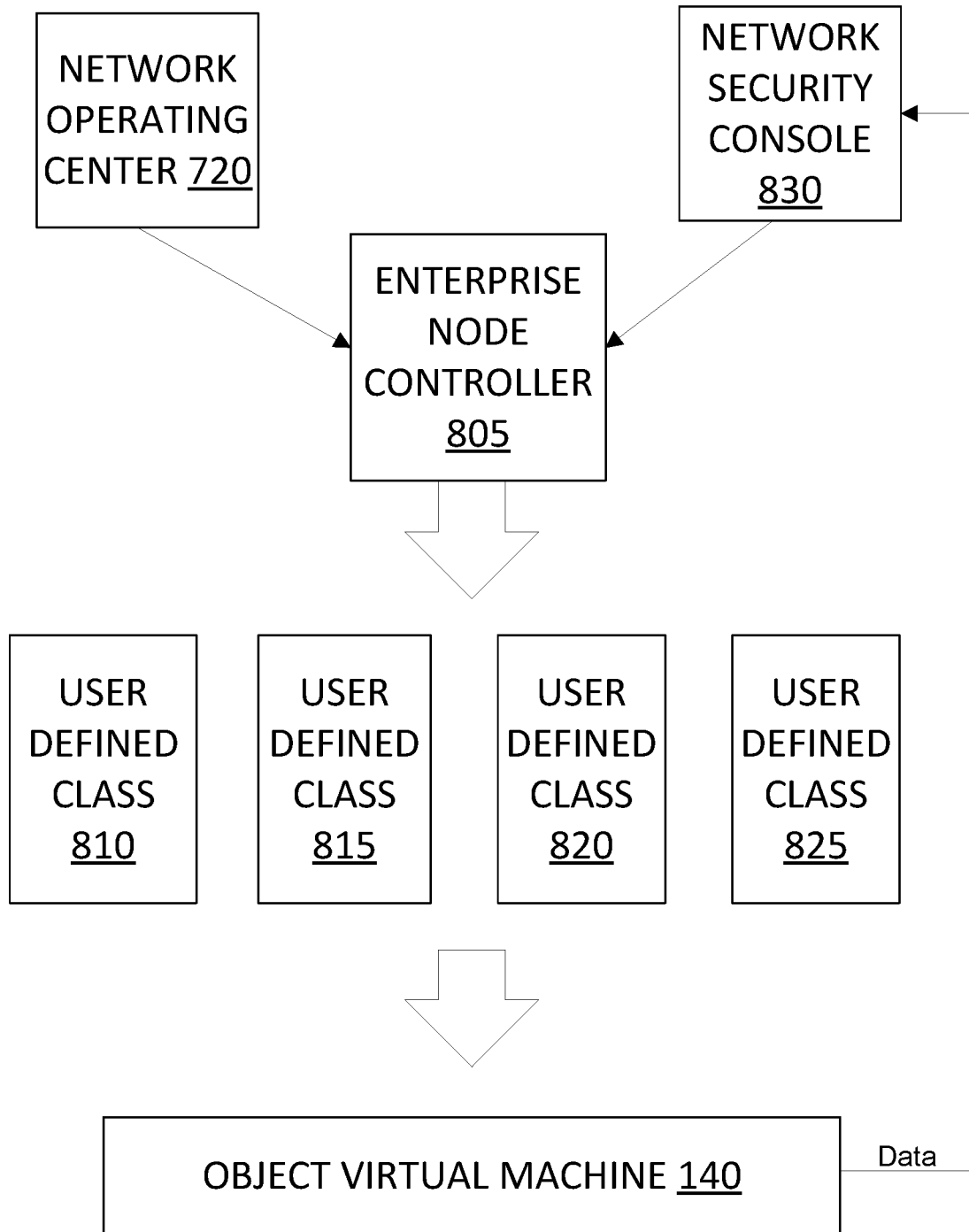
FIG. 8 illustrates another exemplary embodiment of deploying network services using user defined objects.

FIG. 7 and FIG. 8 illustrate exemplary embodiments of using servicing nodes with user defined classes and objects. In the exemplary embodiment of FIG. 7, node controller 160 offers cloud services, and sends user defined classes 703, 704, and 705 to servicing node 125. User defined class 704 is designed for cloud services offered to an area or a city, and it includes, but is not limited to, configurable attributes specifying security policies, service policies, IP address space, data collection policies, resource and capacity policies, and supported network applications. User defined class 705 is designed to offer aggregated cloud services over a region or a collection of area services. User defined class 705 may include aggregated IP address space, service policies, application policies, and capacities. User defined class 703 is designed for an aggregated cloud service covering a large geographic area.

In some embodiments, node controller 160 sends a user defined object configuration 710 to object virtual machine 140 to create a plurality of user defined objects based on user defined class 704. These created user defined objects for user defined class 704 are configured for various cities and area districts, each of which is configured with different attributes of security policies and other attributes. In other embodiments, the user defined object configuration 710 configures a plurality of objects based on user defined class 705. These created objects based on user defined class 705 are configured for regions, each of which covers a plurality of cities and area districts corresponding to the objects based on user defined class 704.

In various embodiments, user defined object configuration 710 includes a configuration for a user defined object based on user defined class 703. The created object is configured for a customer 715 of node controller 160. The customer can be a business, a small cloud service provider, a company, an organization, or a private cloud. The user defined classes 703, 704, and 705 may be associated to a license related to the customer 715. The license is verified by license manager 420.

In some embodiments, node controller 160 is associated to a network operating center 720 which obtains statistics data associated to the created user defined objects. Network operating center 720 monitors and manages operation of a data network containing servicing node 125. In other embodiments, node controller 160, which can be a cloud service provider, is associated to billing server 725 which obtains accounting data associated to the created user defined objects. Billing server 725 may generate a billing statement based on the obtained accounting data for customer 715.

FIG. 8 illustrates an exemplary embodiment of user defined classes in an enterprise. Enterprise node controller

805 represents a node controller for an IT department of an enterprise. Enterprise node controller 805 provides user defined class 810, designed to offer company-wide services; user defined class 815, designed to offer departmental services; user defined class 820, designed to offer individual or group level services; and user defined class 825, designed specifically for sales department. Enterprise node controller 805 monitors the IT services using network operating center 720 and specially monitors security breaches and alerts using network security console 830, which obtains security related statistics data from object virtual machine 140.

Figure 9:
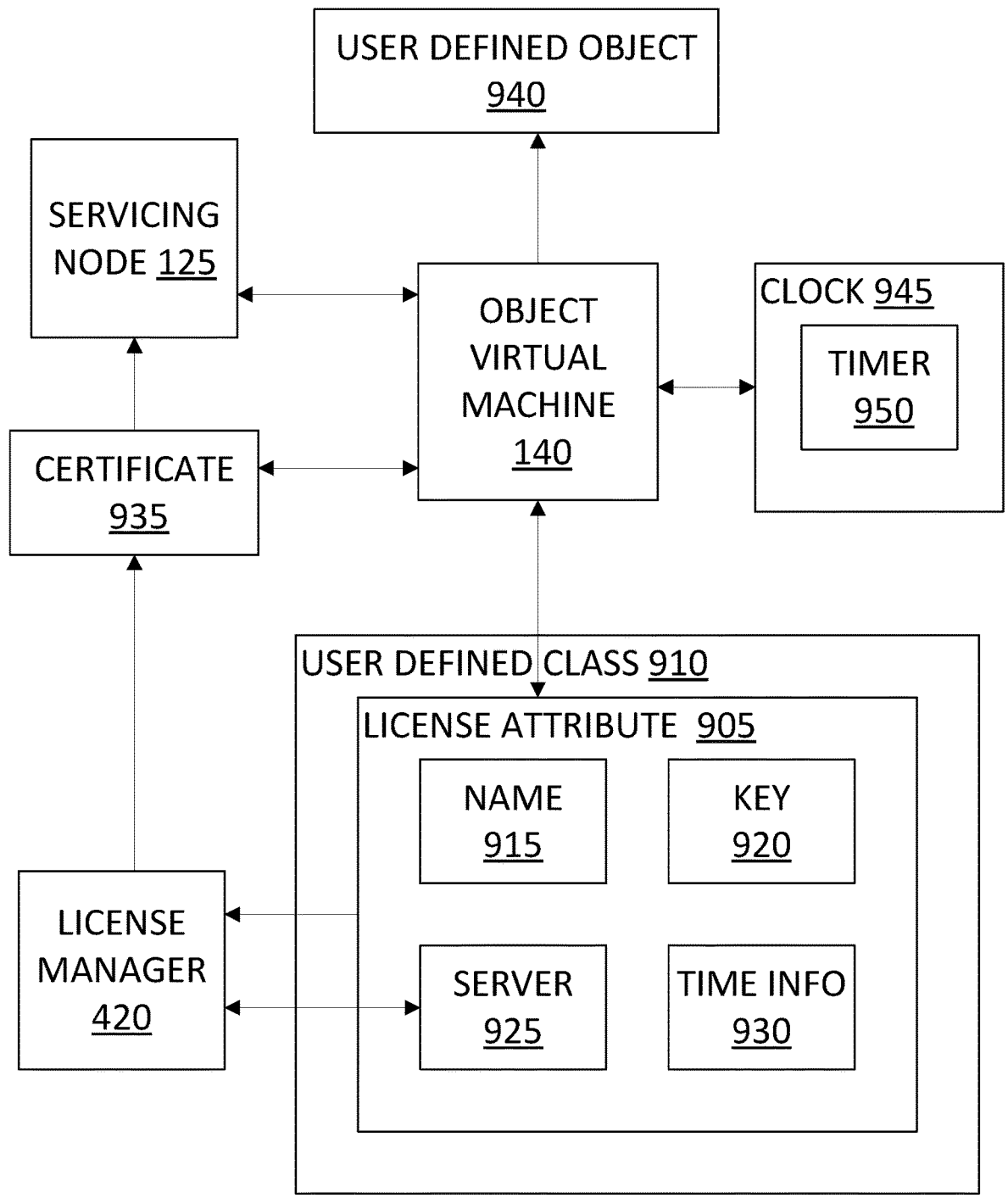
FIG. 9 illustrates an exemplary embodiment of creating a user defined object using license attribute information.

FIG. 9 illustrates an exemplary embodiment of creating a user defined object using license attribute 905 information. The license attribute 905 information may be for a license that is valid for a specified period of time. For example, the license may be valid for a set number of minutes, hours, days, months, or any other specified time period. The client of the network device can thus configure the network device to enable and disable the license on an on-demand basis, for any fixed length of time, or upon certain trigger events. In this way, a license can be periodically issued and relinquished repeatedly, on an on-demand basis. In an exemplary embodiment, the client of the network device can issue a license to allow the network device to be programmed to allow access to a particular sports event for a few hours, and then automatically disable the license at the end of the time period. In various embodiments, the license can be disabled upon the instruction of the client or other designated user, or upon certain trigger events.

In the exemplary embodiment illustrated in FIG. 9, license attribute 905 of user defined class 910 comprises additional information such as one or more of name 915, key 920, server 925, and time information 930. Object virtual machine 140 uses license attribute 905 to obtain certificate 935 in order to create user defined object 940 of user defined class 910. Server 925 specifies license manager 420, and server 925 may include an IP address of license manager 420, a Web address, a URL, a domain name, or a server name identity for license manager 420. Object virtual machine 140 uses server 925 to determine license manager 420. In some embodiments, object virtual machine 140 uses server 925 information to establish a session with license manager 420. In another embodiment, object virtual machine 140 includes information about license manager 420 and does not use server 925 information to establish the session.

In some embodiments, time information 930 includes one or more of a time duration, a starting time, a starting date, an ending time, an ending date, a list of times, or a recurring indication.

In various embodiments, name 915 comprises an identity of a license. Key 920 may comprise a license key, a public key, a private key, or any confidential key.

Object virtual machine 140 sends license name 915, key 920, and time information 930 to license manager 420. Furthermore, object virtual machine 140 may send additional information to license manager 420 about servicing node 125 such as product label, serial number, pre-determined licenses of servicing node 125, or one or more of previously obtained certificates of previously created user defined objects.

In an exemplary embodiment, license manager 420 processes the received information and responds with certificate 935. Object virtual machine 140 creates user defined object 940 and associates user defined object 940 with certificate 935. Object virtual machine 140 may store certificate 935 in a storage module of servicing node 125.

In some embodiments, certificate 935 includes a time duration indicating validity of certificate 935 for the license. Furthermore, object virtual machine 140 may be connected to a clock 945. Object virtual machine 140 sets up a timer 950 using clock 945, and timer 950 is set according to the time duration of certificate 935. In various embodiments, when timer 950 expires, object virtual machine 140 obtains a further certificate for user defined object 940. In another embodiment, when timer 950 expires, indicating that the license has expired, object virtual machine 140 stops using or restricts usage of user defined object 940. Additionally, object virtual machine 140 may inform servicing node 125 an indication of expiration of timer 950 or certificate 935. In various embodiments, object virtual machine 140 removes user defined object 940 after expiration of certificate 935.

In some embodiments, one or more information of license attribute 905 may be specified in a user defined class configuration (not shown) which is used by object virtual machine 140 to create user defined object 940. Additionally, as discussed herein with reference to other exemplary embodiments, license manager 420 may be in communication with billing server 725 and other components of the network. In this way, the network device may be programmable with user-defined scripts to allow the client to operate its own customized license and billing scheme for the use of the network device.

Figure 10:
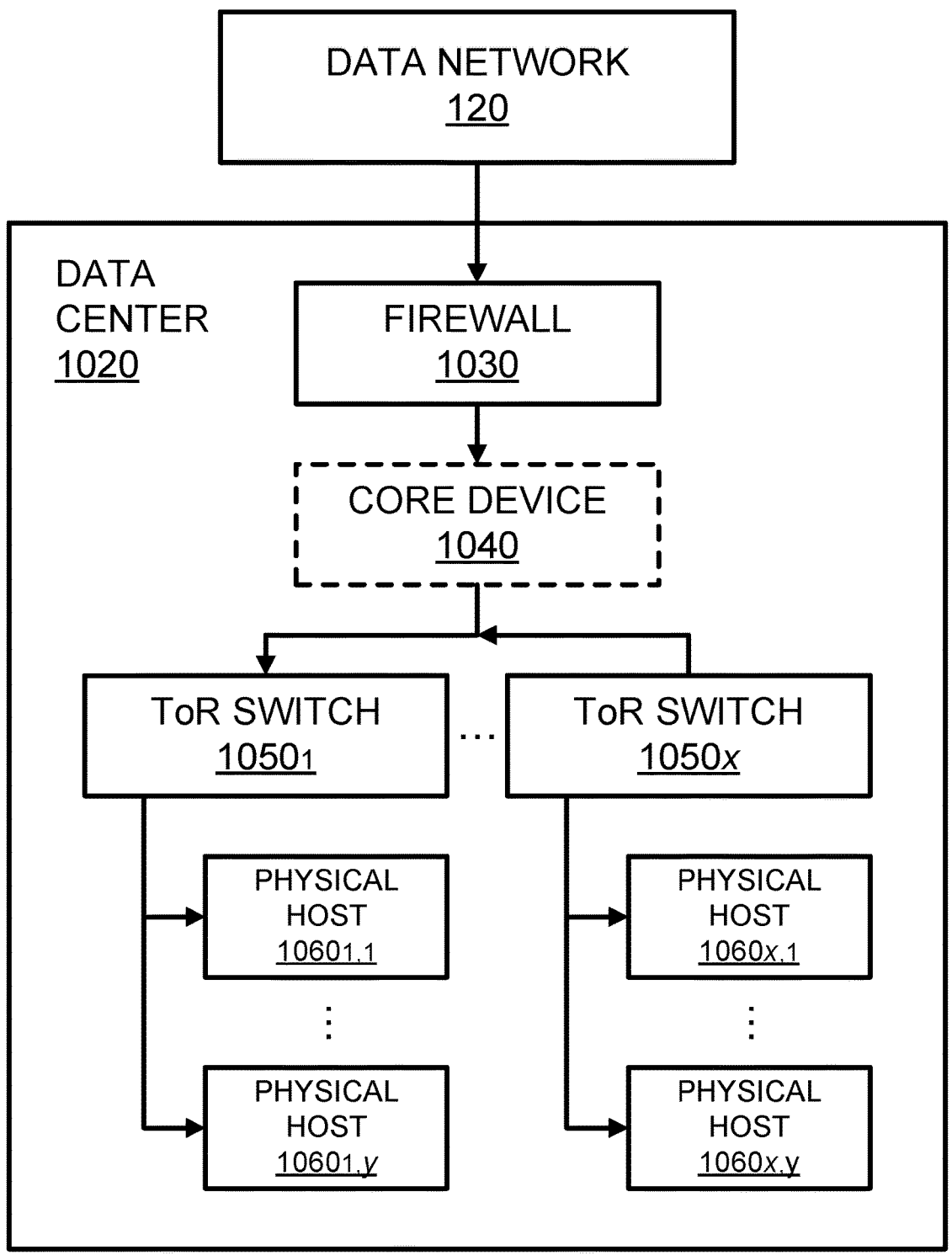
FIG. 10 illustrates an exemplary system according to various embodiments.

FIG. 10 illustrates a system 1000 according to various embodiments. System 1000 includes data network 120 and data center 1020. Data center 1020 includes firewall 1030, optional core switch/router (also referred to as a core device) 1040, Top of Rack (ToR) switches 1050$_1$-1050$_x$, and physical hosts 1060$_{1,1}$-1060$_{x,y}$.

Data center 1020 is a facility used to house computer systems and associated components. Data center 1020, for example, comprises computing resources for cloud computing services or computing resources operated for the benefit of a particular organization. Data center equipment, for example, is generally mounted in rack cabinets, which are usually placed in single rows forming corridors (e.g., aisles) between them. Firewall 1030 creates a barrier between data center 1020 and data network 120 by controlling incoming and outgoing network traffic.

Optional core switch/router 1040 is a high-capacity switch/router that serves as a gateway to data network 120 and provides communications between ToR switches 1050$_1$ and 1050$_x$, and between ToR switches 1050$_1$ and 1050$_x$ and data network 120. ToR switches 1050$_1$ and 1050$_x$ connect physical hosts 1060$_{1,1}$-1060$_{1,y}$ and 11600$_{x,1}$-1060$_{x,y}$ (respectively) together and to data network 120 (optionally through core switch/router 1140). For example, ToR switches 1050$_1$-1050$_x$ use a form of packet switching to forward data to a destination physical host (of physical hosts 1060$_{1,1}$-1060$_{1,y}$) and (only) transmit a received message to the physical host for which the message was intended. Physical hosts 1060$_{1,1}$-1060$_{x,y}$ are computing devices that act as computing servers such as blade servers.

Physical hosts 1060$_{1,1}$-1060$_{x,y}$ are computing devices that act as computing servers such as blade servers. Each of physical hosts 1060$_{1,1}$-1060$_{x,y}$ may host one or more virtual machines (VMs). Each VM may have an operating system (OS) and one or more applications using the OS. Each VM and respective OS appears to have the respective physical host's processor, memory, and other resources all to itself. However, the physical host's processor and resources are allocated to each VM and respective OS such that they do not disrupt other VMs and their respective OSes.

Figure 11:
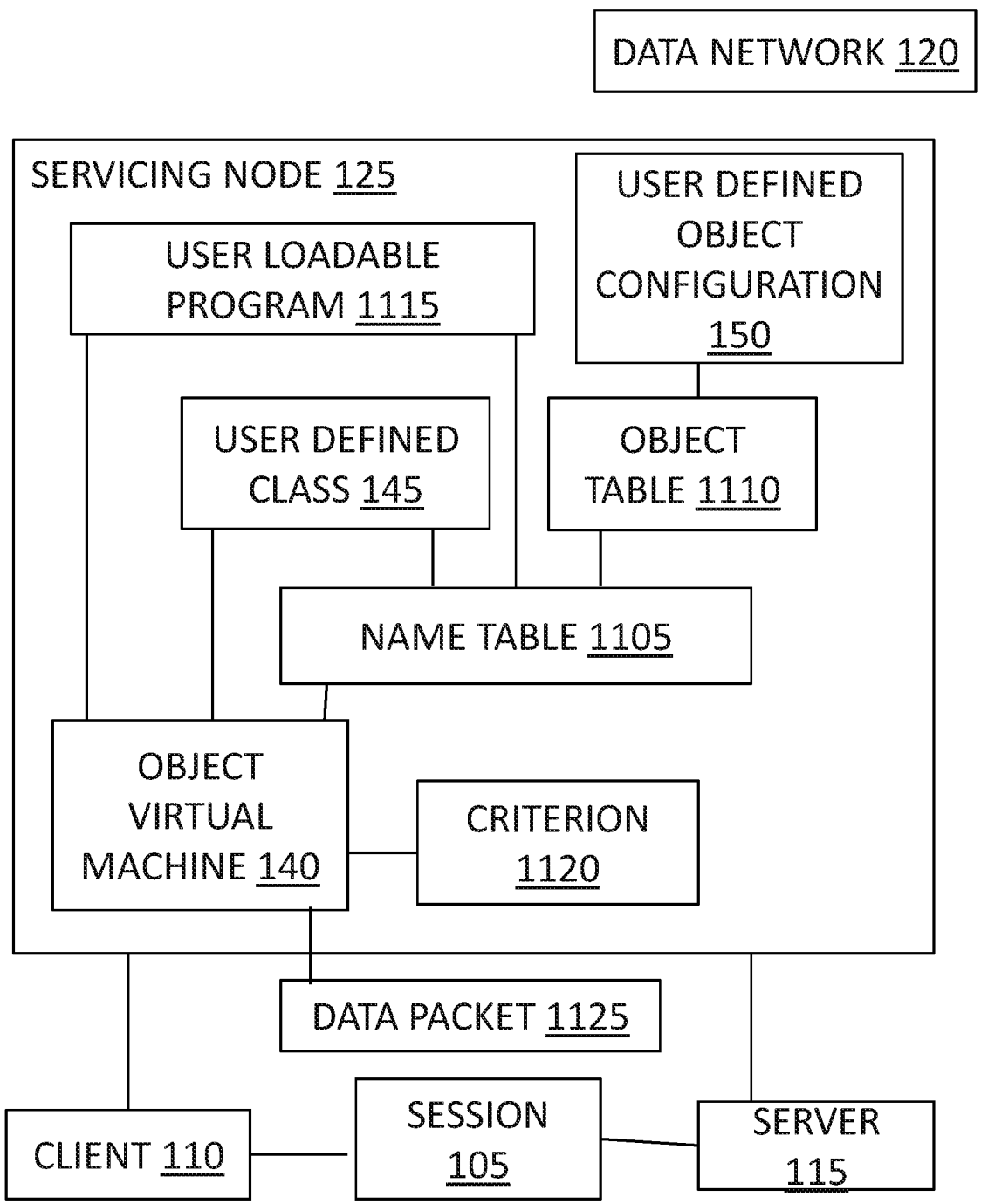
FIG. 11 illustrates an exemplary embodiment of a network servicing node servicing a session based on user defined classes and user loadable programs.

FIG. 11 illustrates an exemplary embodiment where servicing node 125 includes object virtual machine 140 module, which may include a software module, a hardware module, or a combination of software and hardware. In various embodiments, servicing node 125 is in at least one of ToR switches $1050_1$-$1050_x$ and/or in at least one VM in physical hosts $1060_{1,1}$-$1060_{1,y}$ and $1060_{x,1}$-$1060_{x,y}$. In some embodiments, object virtual machine 140 associates to name table 1105 and object table 1110. Moreover, in various embodiments, servicing node 125 includes at least a user defined class 145. In some embodiments, node controller 155 functions as a system console through which a user operates and/or configures servicing node 125 using at least one of a graphical user interface (GUI), command-line interface (CLI), application programming interface (API), and the like. For example, node controller 155 receives user loadable program 1115 (e.g., from a user) and uploads user loadable program 1115 to servicing node 125.

In some embodiments, user defined class 145 includes a name and one or more configurable attribute fields or attributes. Table 3 illustrates several embodiments of user defined class 145, particularly user defined classes with name "cm-se-region", "cm-se-name", "cpu-controller", "cpu". FIG. 12 illustrates an exemplary embodiment of name table 1105 that includes entries for user defined classes in Table 3.

TABLE 3

User Defined Classes

```
User_defined_class:
  name = cm-se-name,          // Name of User Defined Class
  config-fields:
  config = <start>,
    se-name = string,
    ip = ipv4-cidr,
    bandwidth = number <allowed 200-2000 mbps>,
    conn-limit = number<allowed 1-500>,
  config=<end>;
User_defined_class:
  name=cm-se-region,
  config-fields:
  config=<start>,
    se-region=string,
    se-name=string <list>,
  config=<end>;
User_defined_class:
  name=cpu-controller,
  config-fields:
  config=<start>,
    cpu-count=number<range 1-32>,
  config=<end>;
User_defined_class:
  obj-name=cpu,
  config-fields:
  config=<start>,
    cpu-num=number<1-32>,
    state=string,
  config=<end>;
```

Returning to FIG. 11, servicing node 125 may include at least one user loadable program 1115. In some embodiments, user loadable program 1115 includes a plurality of computer programming instructions, a piece of software, and a plurality of programming instructions for hardware such as FPGA, ASIC, network processor, or processor module of servicing node 125. In various embodiments, user loadable program 1115 includes programming instructions of a programming scripting language such as Python, TCL, XML, Javascript, or a human readable scripting language. In some embodiments, user loadable program 1115 uses an interpreted programming language such as Java. In another embodiment, user loadable program 1115 uses byte code, binary code, or compiled code of a scripting language. Object virtual machine 140 may also include a different plurality of programming instructions to execute the plurality of programming instructions included in user loadable program 1115.

TABLE 4

User Loadable Programs

```
Fn_pkt_process_rate:   // program name
constant:$low_var = 10000,
constant:$high_var = 100000,
if OPER::system:packet-count-sec > $high_var,
then
    $cpu_count = GET
    CONFIG:system/cpu-controller/cpu-count,
    $cpu_count++,
    SET CONFIG::system/cpu-contoller/cpu-count=$cpu-count,
    CREATE CONFIG::system/cpu/cpu-number=$cpu_count,
    SET CONFIG::system/cpu/cpu-number:$cpu_count active,
    System log "increase cpu cores to" + $cpu_count,
    system set-data-cpu-count $cpu_count,
else
    if OPER::system:packet-count-sec > $low_var,
    then
        $cpu_count = GET CONFIG:system/cpu-controller/cpu-count,
        DELETE CONFIG::system/cpu/cpu_count:$cpu_count,
        $cpu_count--,
        SET CONFIG::system/cpu-contoller/cpu-count=$cpu-count,
        system set-data-cpu-count $cpu_count,
    endif,
endif;
Fn_session_alert:  // program name
constant:$high_session = 3000,
if OPER::system:data_packet is HTTP_REQUEST,
then
    GET
    system/cm-se-region="West Coast";session-count:$session_count,
    CALL system/Fn_confidential_alert,
    if $session_count > $high_session,
    then
        System log "Session High Mark reached for West Coast region",
        SET system/cm-se-region="West Coast";alert_sent=TRUE,
    endif,
endif;
Fn_confidential_alert:      // program name
if OPER::system:data_packet contains "Confidential",
then
    System log "Session May Access Confidential Information",
    endif,
endif;
```

In some embodiments, user loadable program 1115 includes a program name. Table 4 illustrates several embodiments of user loadable program 1115. In some embodiments, name table 1105 includes name of user loadable program 1115. FIG. 12 illustrates an embodiment of name table 1105 to include names of user loadable programs of Table 4.

Figure 14:
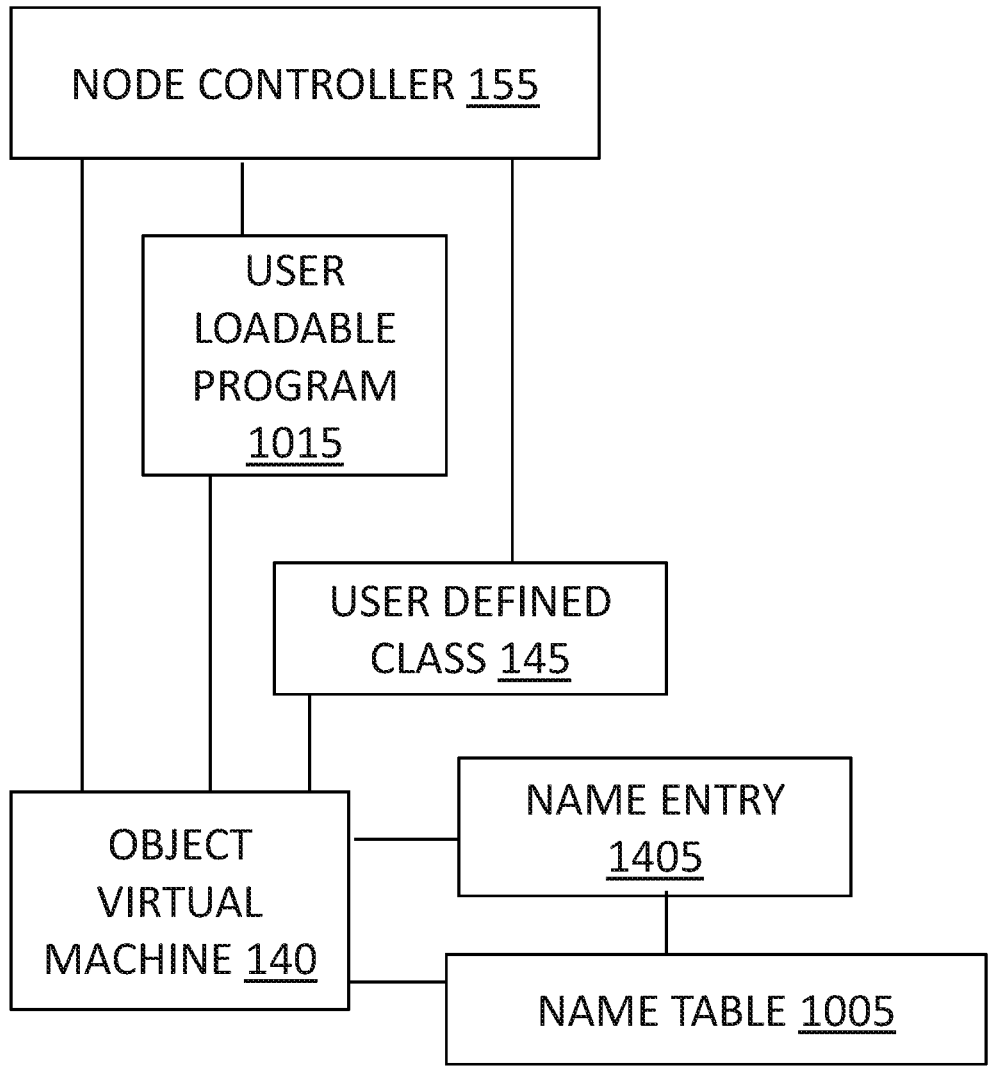
FIG. 14 illustrates an exemplary embodiment of a process to create a name table entry.

FIG. 14 illustrates an exemplary embodiment to create a name entry of name table 1105, object virtual machine 140 processes user defined class 145 to insert into name table 1105. Object virtual machine 140 obtains a name of user defined class 145 and matches the user defined class 145 name against name table 1105. In some embodiments, name table 1105 does not contain the user defined class 145 name. Object virtual machine 140 creates name entry 1405 to store the user defined class 145 name and an association to user defined class 145. Object virtual machine 140 stores name entry 1405 into name table 1105. FIG. 12 illustrates name table 1105 having name entries for user defined classes named "cm-se-region", "cm-se-name", "cpu-controller", and "cpu", after object virtual machine 140 processes and inserts name entries for these user defined classes.

In various embodiments, object virtual machine 140 processes user loadable program 1115 to insert into name table 1105. Object virtual machine 140 obtains a name of user loadable program 1115 and matches the user loadable program 1115 name against name table 1105. In some embodiments, name table 1105 does not contain the user loadable program 1115 name. Object virtual machine 140 creates name entry to store the user loadable program 1115 name, and an association to user loadable program 1115. Object virtual machine 140 stores name entry 1405 into name table 1105. FIG. 12 illustrates name table 1105 having name entries for user loadable programs named "Fn_pkt_process_rate", "Fn_session_alert" and "Fn_confidential_alert", after object virtual machine 140 processes and inserts name entries for these user loadable programs.

In some embodiments, object virtual machine 140 obtains a name, and there is a match of name entry 1405 with name table 1105. Object virtual machine 140 does not insert name entry 1405 into name table 1105. In some embodiments, object virtual machine 140 will generate an error message or alert and sends the error message or alert to node controller 155.

In various embodiments, object virtual machine 140 receives user loadable program 1115 or user defined class 145 from node controller 155 or from a user of servicing node 125, prior to processing and inserting user loadable program 1115 or user defined class 145 into name table 1105.

In some embodiments, user defined class 145 or user loadable program 1115 are stored in a storage module of servicing node 125. Object virtual machine 140 retrieves user loadable program 1115 or user defined class 145 from storage module of servicing node 125 prior to processing and inserting user loadable program 1115 or user defined class 145 into name table 1105.

In various embodiments, name table 1105 is stored in a memory module or a storage medium of servicing node 125. Object virtual machine 140 retrieves name table 1105 from servicing node 125, modifies name table 1105 with name entry 1405, and stores modified name table 1105 into servicing node 125.

Figure 15:
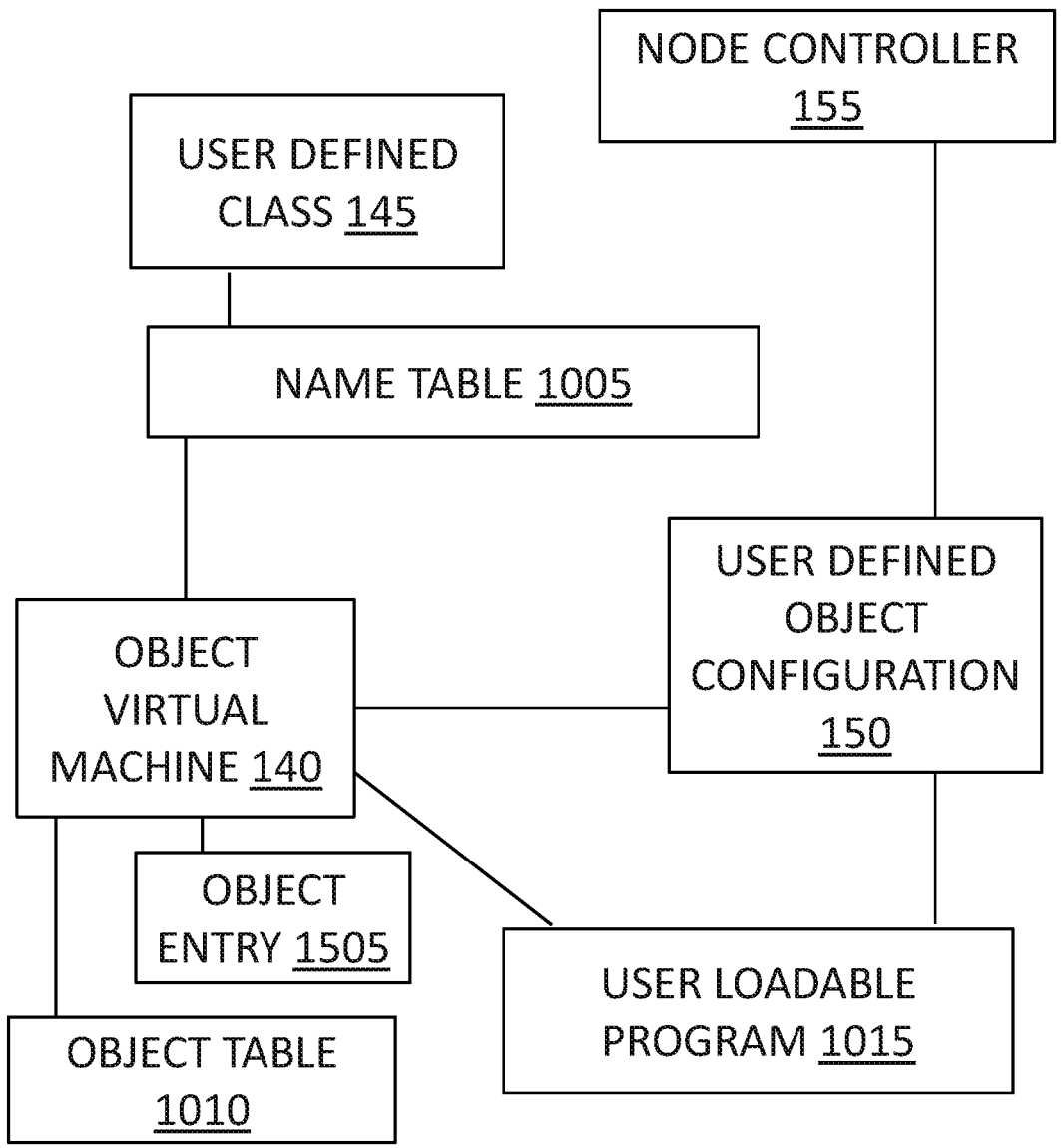
FIG. 15 illustrates an exemplary embodiment of a process to create an object table entry.

Returning to FIG. 11, in exemplary embodiments, a user defined object is created by object virtual machine 140 through a user defined object configuration 150. Referring to an exemplary embodiment illustrated in FIG. 15, object virtual machine 140 generates an object entry 1505 based on user defined object configuration 150 that is associated to user defined class 145. In some embodiments, user defined object configuration 150 includes a name and one or more attribute-value pairs. Object virtual machine 140 matches user defined object configuration 150 name against user defined class names of name table 1105 to obtain a matching user defined class 145. Object virtual machine 140 creates object entry 1505 in object table 1110 corresponding to user defined class 145. In some embodiments, object virtual machine 140 assigns values in user defined object configuration 150 to corresponding configurable attributes of user defined class 145 and stores the one or more attribute-value pairs in object entry 1505 of object table 1110. Table 5 illustrates several embodiments of user defined object configurations. FIG. 13 illustrates an exemplary embodiment of object table 1110 after several user defined object configurations are processed. Object table 1110 includes object entries associated to user defined object configurations in Table 5. In particular, object table 1110 includes an object entry for user defined class name "cm-se-region" with attribute-value pairs "se-region="West Coast"", "se-name"=a list containing "Seattle", "BayArea", "Los Angeles", bw=2500 Mbps; an object entry for user defined class name "cm-se-name" with attribute-value pairs "se-name=Seattle", "ip=1.1.1.0/24", "bw=200 Mbps", "conn-limit=500", "permit-apps=[http, ftp]", and "enable-stats-collection=nil"; an object entry for user defined class name "cpu-controller" with attribute-value pairs "cpu-count=2", an object entry for user defined class name "cpu" with attribute-value pair "cpu-number=1" and an object entry for user defined class name "cpu" with attribute-value pair "cpu-number=2". In these embodiments, user defined classes "cpu", "cpu-controller", "cm-se-name" and "cm-se-region" are illustrated in Table 3.

TABLE 5

User Defined Object Configurations cm-se-name se-name=Seattle ip=1.1.1.0/24 bandwidth=200Mbps
conn-limit=500
cm-se-name se-name="BayArea" ip=1.1.3.0/23
bandwidth=500Mbps conn-limit=2000
cm-se-name se-name="Los Angeles" ip=1.1.5.0/23
    bandwidth=1000Mbps conn-limit=2500
cm-se-region se-region="West Coast" se-name=[Seattle, Bay Area,
"Los Angles"]

In some embodiments, object virtual machine 140 receives user defined object configuration 150 from node controller 155 over a data network. In another embodiment, object virtual machine 140 receives user defined object configuration 150 through executing programming instructions of user loadable program 1115. Table 4 illustrates a programming instruction "CREATE CONFIG::system/cpu/cpu-number=$cpu_count" which when executed by object virtual machine 140 creates an object associated to user defined class named "cpu" (illustrated in Table 3), with an attribute-value pair "cpu-number=$cpu-count" where "$cpu-count" is the value of the variable "$cpu-count".

Variables may be used as system hooks into servicing node 125. In some embodiments, user loadable program 1115 (and user defined object configurations 150) access resources of servicing node 125 and receive operating information (of servicing node 125). For example, operating information include one or more of memory utilization (e.g., percentage of total available), processor (central processor unit or CPU) utilization (e.g., percentage of total available), bandwidth utilization at an interface (e.g., packets per second), session utilization (e.g., number of user sessions), number of new traffic/packet/network flows in a predetermined time period (e.g., number of new flows every second), number of malformed requests (e.g., Transmission Control Protocol (TCP), UDP (User Datagram Protocol), Hypertext Transfer Protocol (HTTP), etc.), and the like.

FIG. 13 illustrates object table 1110 having two object entries for user defined class "cpu" with attribute-value pairs "cpu-number=1" and "cpu-number=2" respectively. In some embodiments, the object entry with "cpu-number=1" is created from a user defined object configuration obtained when user loadable program Fn_pkt_process_rate is executed. In various embodiments, the object entry with "cpu-number-2" is created from a user defined object configuration received from node controller 155.

In some embodiments, object table 1110 is stored in a memory module or a storage medium of servicing node 125. Object virtual machine 140 then retrieves object table 1110 from servicing node 125, modifies object table 1110, and stores modified object table 1110 into servicing node 125.

In another embodiment, user defined object configuration 150 is stored in a storage medium or a memory module of servicing node 125. Object virtual machine 140 retrieves user defined object configuration 150 from servicing node 125 prior to process user defined object configuration 150.

Returning to FIG. 11, servicing node 125 has name table 1105 and object table 1110. In some embodiments, servicing node 125 receives data packet 1125 of session 105 and invokes object virtual machine 140 to process the data packet 1125. In various embodiments, object virtual machine 140 receives criterion 1120 associated to a condition and name of user loadable program 1115. Table 6 illustrates several criteria embodiments. One criterion in Table 6 is associated with a condition "http port 80" and a user loadable program named "Fn_pkt_process_rate", and a further criterion 1120 is associated with a condition "tcp interface 2.1" to user loadable program name "Fn_session_alert". In various embodiments, criterion 1120 are at least one of an address, port, and protocol. For example, criterion 1120 is an Internet Protocol (IP) address. A port is a software construct serving as a communications endpoint in a computer's host operating system, associated with an IP address of a host and the protocol type of the communication. A port completes the destination or origination address of a communications session. A port may be identified with a port number. For example, the protocol is an application protocol, such as: Domain Name System (DNS), File Transfer Protocol (FTP), Hypertext Transfer Protocol (HTTP), Internet Message Access Protocol (IMAP), Lightweight Directory Access Protocol (LDAP), Network Time Protocol (NTP), Post Office Protocol (POP), Simple Mail Transfer Protocol (SMTP), Simple Network Management Protocol (SNMP), Transport Layer Security (TLS), Extensible Messaging and Presence Protocol (XMPP), and the like. In some embodiments, object virtual machine 140 determines if data packet 1125 satisfies condition of criterion 1120, and then object virtual machine 140 invokes user loadable program 1115 using the user loadable program name in the criterion 1120 and name table 1105. Using Table 6 to illustrate, object virtual machine 140 determines if data packet 1125 satisfies condition "http port 80" by checking if data packet 1125 is a HTTP data packet using TCP port 80. When the condition is satisfied, object virtual machine 140 invokes user loadable program "Fn_pkt_process_rate" for data packet 1125. In another example, object virtual machine 140 determines if data packet 1125 satisfies condition "tcp interface 2.1" by checking if data packet 1125 is a TCP data packet received from network interface "2.1". When the condition is satisfied, object virtual machine 140 invokes user loadable program "Fn_session_alert" for data packet 1125.

TABLE 6

Figure 16:
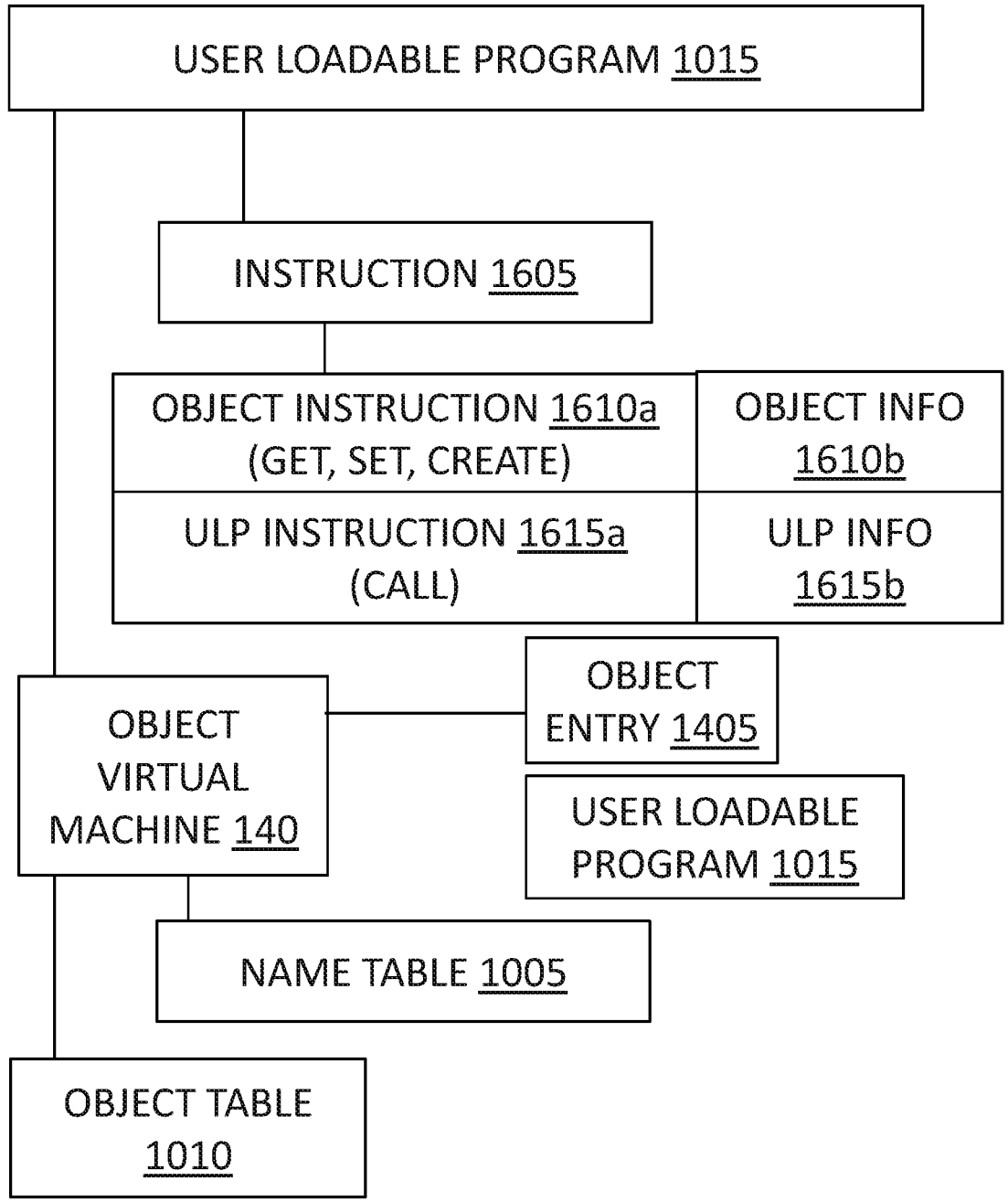
FIG. 16 illustrates an exemplary embodiment to process an instruction of a user loadable program.

User Loadable Program Criteria service http port 80 when packet received inovoke
script_Fn_pkt_process_rate
service tcp interface 2.1 when packet received invoke
script Fn_session_alert FIG. 16 illustrates an exemplary embodiment of executing programming instructions of user loadable program 1115. Object virtual machine 140 executes an instruction 1605 of user loadable program 1115. In some embodiments, instruction 1605 includes an object instruction 1610*a*, such as a "GET", "SET" or "CREATE" instruction, which also includes object information 1610*b*. If object instruction 1605*a* is a "CREATE" instruction, object virtual machine 140 creates a user defined object using object information 1610*b*. An exemplary embodiment of creating user defined object 135 based on a user loadable program was explained above and is not repeated here.

Table 4 illustrates a number of embodiments of object instructions 1610*a* for "GET", "SET" and "CREATE".

In some embodiments, object instruction 1610*a* is a "GET" instruction to obtain an object entry from object table 1110, or to obtain an attribute-value-pair of an object entry in object table 1110. In another embodiment, object instruction 1610*a* is a "SET" instruction to modify or set an attribute-value-pair of an object entry in object table 1110.

In some embodiments, object instruction 1610*a* is a "GET" instruction and includes object information 1610*b* that includes a user defined class name and one or more attribute-value-pairs. Object virtual machine 140 looks up object table 1110 to determine object entry 1505 matching the user defined class 145 name and the one or more attribute-value-pairs of object information 1610*b*. If there are one or more matching entries, object virtual machine 140 may select among the one or more matching object entries, object entry 1505 by selecting a first found matching object entry or randomly a matching object entry. In various embodiments, an attribute value-pair in the one or more attribute-value pairs of objection information 1610*b* indicates a variable (e.g. a name starting with "$" symbol), and object virtual machine 140 replaces the variable by its value prior to using the attribute-value-pair for further process.

In various embodiments, object instruction 1610*a* is a "SET" instruction and includes object information 1610*b* that includes a user defined class 145 name and one or more attribute-value-pairs. Object virtual machine 140 looks up object table 1110 to determine object entry 1505 matching the user defined class name and the one or more attribute-value-pairs of object information 1610*b*. If there are one or more matching entries, object virtual machine 140 may select among the one or more matching object entries by selecting a first found matching, object entry 1505, or randomly a matching object entry. In various embodiments, object virtual machine 140 modifies one or more attribute-pairs in object entry 1505 by corresponding one or more attribute-value-pairs in object information 1610*b*. If object entry includes an attribute-value-pair not having a corresponding attribute-value-pair in object information 1610*b*, the attribute-value-pair is not modified. In some embodiments, if object entry 1505 does not include an attribute-value-pair corresponding to an attribute-value pair in object information 1610*b*, object virtual machine 140 will insert a new attribute-value-pair into object entry corresponding to the attribute-value pair in object information 1610*b*.

In some embodiments, an attribute-value-pair in object entry 1505 or in objection information 1610*b* is marked "key", indicating the attribute-value-pair is used for matching purposes and is not used to modify object entry 1505. The "key" marker may indicate when object entry 1505 was created in an earlier process. In various embodiments, a configurable attribute in a user defined class has a "key" marker to indicate the corresponding attribute-value-pair for the marked attribute is marked when an object entry 1505 is created for the user defined class. In some embodiments, object virtual machine 140 only matches objection information 1610*b* to object entry 1505 using marked attribute-value-pairs and does not match unmarked attribute-value-pairs.

In an exemplary embodiment, instruction 1605 includes a user loadable program (ULP) instruction "CALL" 1615*a* and ULP information 1615*b*. A ULP instruction 1615*a* indicates to object virtual machine 140 to look up for a corresponding user loadable program 1115 and to execute instructions of user loadable program 1115 according to ULP information 1615b. In some embodiments, ULP information 1615b includes a name. Object virtual machine 140 matches the ULP information 1615b name against name table 1105 to obtain user loadable program 1115. Object virtual machine 140 executes user loadable program 1115 according to any additional information in ULP information 1615b. In some embodiments, when user loadable program 1115 includes one or more input program parameter variables and ULP information 1615b includes one or more values, object virtual machine 140 executes user loadable program 1115 by assigning the one or more values of ULP information 1615b to the corresponding one or more input program parameter variables. When ULP information 1615b does not include any additional information, object virtual machine 140 executes user loadable program 1115 without any information passing from ULP information 1615b to user loadable program 1115. In some embodiments, after executing user loadable program 1115, object virtual machine 140 resumes executing user loadable program 1115. In an exemplary embodiment illustrated in Table 4, user loadable program "Fn_session_alert" includes a "CALL" instruction to invoke user loadable program "Fn_confidential_alert".

In various embodiments, when instruction 1605 is neither an object instruction 1610a nor a ULP instruction 1615a, object virtual machine 140 executes instruction 1605 using other resources of object virtual machine 140 or servicing node 155. Table 4 illustrates several embodiments of instruction 1605 that are not an object instruction nor a ULP instruction.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A system for configuring a network servicing node with user-defined instruction scripts, the system comprising: the network servicing node, the network servicing node including a hardware network device, the network servicing node comprising: a network interface to a data network, the network interface being coupled to an object machine; and the object machine, wherein the object machine is a hardware module and includes a processor configured to: receive, from a user of the network servicing node, a user loadable program, the user loadable program comprising at least the user-defined instruction scripts, a user-defined object configuration, and a user-defined class; receive a data packet from the data network using the network interface associated with the user, the data packet comprising at least one of a destination address, a destination port number, and an application protocol; determine a condition associated with the at least one of the destination address, the destination port number, and the application protocol; identify, in a name table, a program name associated with a program using the condition, wherein the program is the user loadable program; based on the user-defined object configuration and the user-defined class associated with the user loadable program, generate, at the network servicing node, a user-defined object, the user-defined object including one or more parameters to enable the user-defined instruction scripts to be executed on the network servicing node; and process the data packet by applying the user-defined object to the data packet, getting an instruction of the user-defined instruction scripts from a storage module of the network servicing node, and applying the instruction to the data packet; and the storage module configured to store at least the user-defined instruction scripts; obtain a further program name and at least one program parameter value using the object information; find an association with a further program corresponding to the further program name using the name table; and execute the further program to further process and apply to the data packet using the association with the further program and the at least one program parameter value; and the storage module configured to store at least the user-defined instruction scripts.

2. The system of claim 1, wherein the user loadable program further comprises object information, wherein the object machine further: obtains a class name using the object information; creates a name entry in the name table; links the class name to a respective class; and stores the class name and respective class in the name entry.

3. The system of claim 1, wherein the user loadable program further comprises object information, wherein the object machine further: obtains a further program name using the object information; creates a name entry in the name table; links the further program name to a respective further program; and stores the further program name and the respective further program in the name entry.

4. The system of claim 1, wherein the user loadable program further comprises object information, wherein the object machine further: obtains a class name and at least one attribute using the object information; finds an object entry associated with the class name and at least one attribute using an object table, the object entry including values associated with each of the at least one attribute, the values associated with at least one operating parameter of the network node; and provides the values using the object entry.

5. The system of claim 4, wherein the at least one operating parameter includes at least one of the following: a memory utilization, processor utilization, bandwidth utilization at an interface, session utilization, number of new flows per second, and number of malformed requests.

6. The system of claim 1, wherein the user loadable program further comprises object information, wherein the object machine further: obtains a class name and at least one attribute using the object information; finds at least two object entries associated with the class name and at least one attribute using an object table, the object entries each including values associated with each of the at least one attribute, the values associated with at least one operating parameter of the network node; selects one of the following: a first of the at least two object entries and an object entry of the at least two object entries to obtain a selected object entry; and provides the values using the selected object entry.

7. The system of claim 6, wherein the at least one operating parameter includes at least one of the following: a memory utilization, processor utilization, bandwidth utilization at an interface, session utilization, number of new flows per second, and number of malformed requests.

8. The system of claim 1, wherein the user loadable program further comprises object information, wherein the object machine further: obtains a class name, at least one attribute, and at least one value associated with each at least one attribute using the object information; finds an object entry associated with the class name and at least one attribute using an object table; and modifies the object entry to include the at least one value associated with each at least one attribute.

9. The system of claim 1, wherein the user loadable program further comprises object information, wherein the object machine further: obtains a class name, at least one attribute, and at least one value associated with each at least one attribute using the object information; finds at least two object entries associated with the class name and at least one attribute using an object table, the object entries each including values associated with each of the at least one attribute; selects one of the following: a first of the at least two object entries and an object entry of the at least two object entries to obtain a selected object entry; and modifies the selected object entry to include the at least one value associated with each at least one attribute.

10. A method for configuring a network servicing node with user-defined instruction scripts, the method comprising: receiving, from a user of the network servicing node, a user loadable program, the user loadable program comprising at least the user-defined instruction scripts, a user-defined object configuration, and a user-defined class; receiving a data packet from a data network using a network interface associated with the user, the data packet comprising at least one of a destination address, a destination port number, and an application protocol; determining a condition associated with the at least one of the destination address, the destination port number, and the application protocol; identifying, in a name table, a program name associated with a program using the condition, wherein the program is the user loadable program; based on the user-defined object configuration and the user-defined class associated with the user loadable program, generating, at the network servicing node, a user-defined object, the user-defined object including one or more parameters to enable the user-defined instruction scripts to be executed on the network servicing node; and processing the data packet by applying the user-defined object to the data packet, getting an instruction of the user-defined instruction scripts from a storage module of the network servicing node, and applying the instruction to the data packet; obtain a further program name and at least one program parameter value using the object information; find an association with a further program corresponding to the further program name using the name table; and execute the further program to further process and apply to the data packet using the association with the further program and the at least one program parameter value; and the storage module configured to store at least the user-defined instruction scripts.

11. The method of claim 10, wherein the user loadable program further comprises object information, wherein the method further comprises: obtaining a class name using the object information; creating a name entry in the name table; linking the class name to a respective class; and storing the class name and respective class in the name entry.

12. The method of claim 10, wherein the user loadable program further comprises object information, wherein the method further comprises: obtaining a further program name using the object information; creating a name entry in the name table; linking the further program name to a respective further program; and storing the further program name and the respective further program in the name entry.

13. The method of claim 10, wherein the user loadable program further comprises object information, wherein the method further comprises: obtaining a class name and at least one attribute using the object information; finding an object entry associated with the class name and at least one attribute using an object table, the object entry including values associated with each of the at least one attribute, the values associated with at least one operating parameter of the network node; and providing the values using the object entry.

14. The method of claim 13, wherein the operating parameter is at least one of a memory utilization, processor utilization, bandwidth utilization at an interface, session utilization, number of new flows per second, and number of malformed requests.

15. The method of claim 10, wherein the user loadable program further comprises object information, wherein the method further comprises: obtaining a class name and at least one attribute using the object information; finding at least two object entries associated with the class name and at least one attribute using an object table, the object entries each including values associated with each of the at least one attribute, the values associated with at least one operating parameter of the network node; selecting one of the following: a first of the at least two object entries and an object entry of the at least two object entries to obtain a selected object entry; and providing the values using the selected object entry.

16. The method of claim 15, wherein the operating parameter is at least one of a memory utilization, processor utilization, bandwidth utilization at an interface, session utilization, number of new flows per second, and number of malformed requests.

17. The method of claim 10, wherein the user loadable program further comprises object information, wherein the method further comprises: obtaining a class name, at least one attribute, and at least one value associated with each at least one attribute using the object information; finding an object entry associated with the class name and at least one attribute using an object table; and modifying the object entry to include the at least one value associated with each at least one attribute.

18. The method of claim 10, wherein the user loadable program further comprises object information, wherein the method further comprises: obtaining a class name, at least one attribute, and at least one value associated with each at least one attribute using the object information; finding at least two object entries associated with the class name and at least one attribute using an object table, the object entries each including values associated with each of the at least one attribute; selecting one of the following: a first of the at least two object entries and an object entry of the at least two object entries to obtain a selected object entry; and modifying the selected object entry to include the at least one value associated with each at least one attribute.

19. A system for configuring a network servicing node with user-defined instruction scripts, the system comprising: the network servicing node, the network servicing node including a hardware network device, the network servicing node comprising: a network interface to a data network, the interface being coupled to an object machine; and the object machine, wherein the object machine is a hardware module and includes a processor configured to: receive, from a user of the network servicing node, a user loadable program, the user loadable program comprising at least user-defined instruction scripts, object information, a user-defined object configuration, and a user-defined class; receive a data packet from the data network using the network interface associated with the user, the data packet comprising at least one of a destination address, a destination port number, and an application protocol; determine a condition associated with the at least one of the destination address, the destination port number, and the application protocol; identify, in a name table, a program name associated with a program using the condition, wherein the program is the user loadable program; based on the user-defined object configuration and the user-defined class associated with the user loadable program, generate, at the network servicing node, a user-defined object, the user-defined object including one or more parameters to enable the user-defined instruction scripts to be executed on the network servicing node; process the data packet by applying the user-defined object to the data packet, getting an instruction of the user-defined instruction scripts from a storage module of the network servicing node, and applying the instruction to the data packet; obtain a further program name and at least one program parameter value using the object information; find an association with a further program corresponding to the further program name using the name table; and execute the further program to further process and apply to the data packet using the association with the further program and the at least one program parameter value; and the storage module configured to store at least the user-defined instruction scripts.

* * * * *